United States Patent
Lin

(10) Patent No.: US 12,477,315 B2
(45) Date of Patent: Nov. 18, 2025

(54) TARGETED PDU CAPTURE BY A NETWORK DEVICE FOR ENHANCED WIRELESS NETWORK DIAGNOSTICS

(71) Applicant: Palo Alto Networks, Inc., Santa Clara, CA (US)

(72) Inventor: Ta Chien Lin, Oakland, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 363 days.

(21) Appl. No.: 18/055,461

(22) Filed: Nov. 15, 2022

(65) Prior Publication Data

US 2023/0180099 A1 Jun. 8, 2023

Related U.S. Application Data

(60) Provisional application No. 63/265,126, filed on Dec. 8, 2021.

(51) Int. Cl.
*H04W 8/02* (2009.01)
*H04L 61/103* (2022.01)
(Continued)

(52) U.S. Cl.
CPC ............. *H04W 8/02* (2013.01); *H04L 61/103* (2013.01); *H04L 61/5014* (2022.05);
(Continued)

(58) Field of Classification Search
CPC ............. H04L 2101/622; H04L 61/103; H04L 61/5014; H04W 24/08; H04W 24/10; H04W 40/246; H04W 8/02; H04W 80/02
See application file for complete search history.

(56) References Cited

U.S. PATENT DOCUMENTS

| | | | | |
|---|---|---|---|---|
| 5,842,040 A | * | 11/1998 | Hughes | H04L 63/0254 710/11 |
| 6,538,997 B1 | * | 3/2003 | Wang | H04L 12/462 370/256 |

(Continued)

OTHER PUBLICATIONS

Phang, et al., "Design and Implementation of V6SNIFF: An Efficient IPv6 Packet Sniffer", 2008 Third International Conference on Convergence and Hybrid Information Technology, Nov. 2008, pp. 44-49.

(Continued)

*Primary Examiner* — Dung B Huynh
(74) *Attorney, Agent, or Firm* — Gilliam IP PLLC

(57) ABSTRACT

A network device with wireless access point capabilities selectively captures PDUs detected on an instrumented interface(s) to capture those of one or more types/subtypes "of interest." PDU types/subtypes that network device interface(s) has been instrumented to treat as "of interest" include those transmitted during a device's initial network activity during startup or attempted establishment of a wireless network connection. The interface(s) instrumented for targeted PDU capture can include wireless and/or wired (e.g., Ethernet) interfaces that are received on raw sockets so that each header type of a captured PDU is written to the PDU capture file. Prior to upload of a PDU capture file to a system from which it can be retrieved for analysis, the network device adds network metadata to the file based on context of the environment in which the network device operates. The network metadata can include IP address and/or network topology information determined at runtime.

24 Claims, 7 Drawing Sheets

(51) Int. Cl.
*H04L 61/5014* (2022.01)
*H04W 24/08* (2009.01)
*H04W 40/24* (2009.01)
*H04W 80/02* (2009.01)

(52) U.S. Cl.
CPC ......... *H04W 24/08* (2013.01); *H04W 40/246* (2013.01); *H04W 80/02* (2013.01)

(56) References Cited

U.S. PATENT DOCUMENTS

| | | | | |
|---|---|---|---|---|
| 7,051,038 | B1* | 5/2006 | Yeh | G06F 16/27 707/999.102 |
| 7,206,831 | B1* | 4/2007 | Dube | H04L 43/00 712/228 |
| 7,466,703 | B1* | 12/2008 | Arunachalam | H04L 45/60 370/392 |
| 7,522,540 | B1* | 4/2009 | Maufer | H04W 84/18 370/254 |
| 7,583,611 | B1* | 9/2009 | Robertson | H04W 72/02 709/236 |
| 8,509,252 | B2* | 8/2013 | Chiba | H04L 45/34 370/428 |
| 9,414,094 | B2* | 8/2016 | Van Zijst | H04N 21/23605 |
| 9,426,071 | B1* | 8/2016 | Caldejon | H04L 43/04 |
| 9,430,646 | B1* | 8/2016 | Mushtaq | H04L 67/02 |
| 9,485,525 | B1* | 11/2016 | Oztaskent | H04N 21/25866 |
| 9,537,972 | B1* | 1/2017 | Edwards | H04L 43/106 |
| 9,560,018 | B2 | 1/2017 | Bellagamba et al. | |
| 9,942,787 | B1* | 4/2018 | Tillotson | H04W 24/08 |
| 10,003,660 | B2 | 6/2018 | Furr et al. | |
| 10,025,802 | B2* | 7/2018 | Vermeulen | G06F 16/21 |
| 10,187,400 | B1* | 1/2019 | Castro | H04L 63/1408 |
| 10,567,288 | B1* | 2/2020 | Mutnuru | H04L 67/10 |
| 10,652,713 | B2* | 5/2020 | Chuppala | H04W 4/50 |
| 10,721,250 | B2* | 7/2020 | Ling | H04L 47/4633 |
| 10,841,216 | B1* | 11/2020 | Hoang | H04L 12/465 |
| 11,115,426 | B1* | 9/2021 | Pazhyannur | H04L 41/0686 |
| 11,323,312 | B1 | 5/2022 | Banka et al. | |
| 11,418,928 | B1* | 8/2022 | Hoelzle | H04W 24/08 |
| 11,469,974 | B1* | 10/2022 | Cruise | G06F 11/3006 |
| 11,606,286 | B2 | 3/2023 | Michael et al. | |
| 11,617,125 | B2 | 3/2023 | Kollar et al. | |
| 11,638,150 | B1* | 4/2023 | Visen | H04L 63/166 726/11 |
| 11,700,303 | B1* | 7/2023 | Richards | H04L 67/1097 709/219 |
| 11,792,156 | B1* | 10/2023 | Eyberg | H04L 41/40 709/245 |
| 12,192,820 | B2 | 1/2025 | Yeh et al. | |
| 2002/0150041 | A1* | 10/2002 | Reinshmidt | H04L 43/50 370/216 |
| 2004/0054820 | A1* | 3/2004 | Karaoguz | H04W 8/04 710/10 |
| 2004/0057430 | A1* | 3/2004 | Paavolainen | H04L 12/4633 370/466 |
| 2005/0152290 | A1* | 7/2005 | Sakusabe | H04L 9/40 370/276 |
| 2006/0064751 | A1* | 3/2006 | Ahuja | H04L 63/105 713/176 |
| 2006/0233179 | A1* | 10/2006 | Estrada | H04L 41/12 370/395.54 |
| 2006/0248194 | A1* | 11/2006 | Ly | H04L 67/14 709/226 |
| 2007/0058655 | A1* | 3/2007 | Myers | H04L 61/10 370/437 |
| 2007/0220310 | A1* | 9/2007 | Sharma | G06F 11/1443 714/6.12 |
| 2007/0288994 | A1* | 12/2007 | Tang | H04L 61/35 726/2 |
| 2007/0297334 | A1* | 12/2007 | Pong | H04L 69/12 370/235 |
| 2008/0080495 | A1* | 4/2008 | Barrett | H04L 43/028 370/389 |
| 2008/0186907 | A1* | 8/2008 | Yagyuu | H04B 7/2606 370/328 |
| 2009/0074411 | A1* | 3/2009 | Bernard | H04Q 11/0067 398/58 |
| 2009/0086651 | A1* | 4/2009 | Luft | H04L 41/5067 370/253 |
| 2009/0122801 | A1* | 5/2009 | Chang | H04L 49/354 370/395.53 |
| 2009/0161584 | A1* | 6/2009 | Guan | H04L 12/462 370/256 |
| 2009/0235174 | A1* | 9/2009 | Royt | H04L 41/08 715/734 |
| 2009/0254651 | A1* | 10/2009 | Sheppard | H04L 63/30 709/224 |
| 2010/0011139 | A1* | 1/2010 | Wang | H04L 12/403 710/110 |
| 2010/0274908 | A1* | 10/2010 | Koskelainen | H04L 65/1104 709/227 |
| 2011/0058482 | A1* | 3/2011 | Nomura | H04L 43/04 370/392 |
| 2011/0059723 | A1* | 3/2011 | Oguchi | H04W 8/005 455/410 |
| 2011/0164527 | A1* | 7/2011 | Mishra | H04L 45/308 370/252 |
| 2011/0320870 | A1* | 12/2011 | Kenigsberg | H04L 43/12 714/25 |
| 2012/0030687 | A1* | 2/2012 | Bhandiwad | G06F 9/545 709/227 |
| 2012/0072520 | A1* | 3/2012 | Radulescu | H04L 69/16 709/206 |
| 2012/0144013 | A1* | 6/2012 | Eckert | H04L 67/51 709/224 |
| 2012/0230210 | A1* | 9/2012 | Reed | H04L 43/12 370/252 |
| 2013/0007848 | A1* | 1/2013 | Chaskar | G06F 21/554 726/4 |
| 2013/0064175 | A1* | 3/2013 | Pandey | H04W 8/005 370/328 |
| 2013/0100824 | A1* | 4/2013 | Cao | H04L 41/0677 370/242 |
| 2013/0124738 | A1* | 5/2013 | Lynch | H04W 48/18 709/227 |
| 2013/0142083 | A1* | 6/2013 | Seibert, III | H04L 41/0816 370/255 |
| 2013/0343181 | A1* | 12/2013 | Stroud | H04L 69/22 370/392 |
| 2014/0244733 | A1* | 8/2014 | Han | H04L 43/08 709/203 |
| 2014/0254459 | A1* | 9/2014 | Gelal | H04W 74/0808 370/312 |
| 2014/0269329 | A1* | 9/2014 | Hooda | H04L 47/12 370/238 |
| 2014/0280737 | A1* | 9/2014 | Bicket | H04L 67/02 709/218 |
| 2014/0337614 | A1* | 11/2014 | Kelson | H04L 63/166 713/152 |
| 2014/0355613 | A1* | 12/2014 | Pope | H04L 49/20 370/392 |
| 2015/0200846 | A1* | 7/2015 | Hui | H04L 45/70 370/253 |
| 2015/0264073 | A1* | 9/2015 | Tavakoli | H04L 63/1425 726/23 |
| 2016/0065423 | A1* | 3/2016 | Zhang | H04L 47/125 370/235 |
| 2016/0112287 | A1* | 4/2016 | Farmer | H04L 41/0622 709/224 |
| 2016/0119418 | A1* | 4/2016 | Cho | H04N 21/83 709/217 |
| 2016/0134516 | A1* | 5/2016 | Hui | H04L 45/22 370/235 |
| 2016/0164832 | A1 | 6/2016 | Bellagamba et al. | |
| 2016/0205118 | A1* | 7/2016 | Kim | H04L 63/1425 726/23 |
| 2016/0226826 | A1* | 8/2016 | Pan | H04L 63/1441 |
| 2016/0294689 | A1* | 10/2016 | Zheng | H04L 47/00 |
| 2016/0308986 | A1* | 10/2016 | Bar-Yanai | H04L 67/56 |

(56) References Cited

U.S. PATENT DOCUMENTS

| | | | | |
|---|---|---|---|---|
| 2016/0352601 | A1* | 12/2016 | Zhang | H04L 43/0829 |
| 2017/0012844 | A1* | 1/2017 | Ellison | H04L 69/162 |
| 2017/0019353 | A1* | 1/2017 | Rajapakse | H04L 65/61 |
| 2017/0054709 | A1* | 2/2017 | Benjamin | H04L 63/1408 |
| 2017/0180421 | A1* | 6/2017 | Shieh | H04L 63/10 |
| 2017/0208528 | A1* | 7/2017 | Zhang | H04W 16/18 |
| 2017/0223043 | A1* | 8/2017 | Munoz | H04L 63/20 |
| 2017/0237640 | A1* | 8/2017 | Stocker | G06F 16/955 709/224 |
| 2017/0244745 | A1* | 8/2017 | Key | H04L 63/1408 |
| 2017/0302750 | A1* | 10/2017 | Greenberger | H04L 67/55 |
| 2017/0317969 | A1* | 11/2017 | Masurekar | H04L 12/4633 |
| 2017/0346933 | A1* | 11/2017 | Pope | H04L 69/322 |
| 2018/0139086 | A1* | 5/2018 | Chakraborty | H04W 36/305 |
| 2018/0248770 | A1* | 8/2018 | Regmi | G06F 9/45533 |
| 2018/0270110 | A1* | 9/2018 | Chugtu | H04L 41/0806 |
| 2018/0288145 | A1* | 10/2018 | Levy | G06F 11/1451 |
| 2018/0308111 | A1* | 10/2018 | Bigbee | H04L 41/0853 |
| 2018/0324138 | A1* | 11/2018 | Das | H04L 61/5053 |
| 2018/0351904 | A1* | 12/2018 | Mizik | G06F 9/445 |
| 2019/0036806 | A1* | 1/2019 | Chandrasekaran | H04L 47/22 |
| 2019/0103174 | A1* | 4/2019 | Power | G06F 16/283 |
| 2019/0132199 | A1* | 5/2019 | Sharma | H04L 41/0806 |
| 2019/0132282 | A1* | 5/2019 | Lei | H04L 69/22 |
| 2019/0182364 | A1* | 6/2019 | Dwight | H04L 61/5092 |
| 2019/0190930 | A1* | 6/2019 | Miron | H04L 69/22 |
| 2019/0245700 | A1* | 8/2019 | Dobre | H04L 67/1097 |
| 2019/0254117 | A1* | 8/2019 | Chen | H04L 47/34 |
| 2019/0288934 | A1* | 9/2019 | Chakra | H04L 47/41 |
| 2020/0007421 | A1* | 1/2020 | Bridges | H04L 43/0876 |
| 2020/0029286 | A1* | 1/2020 | Haley | H04L 43/10 |
| 2020/0053063 | A1* | 2/2020 | Chaubey | H04L 63/0464 |
| 2020/0059771 | A1* | 2/2020 | Zhang | H04L 67/1042 |
| 2020/0084147 | A1* | 3/2020 | Gandhi | H04L 43/20 |
| 2020/0090795 | A1* | 3/2020 | Chang | G06F 21/552 |
| 2020/0112334 | A1* | 4/2020 | Kondareddy | H04B 1/7143 |
| 2020/0125462 | A1* | 4/2020 | Zhu | G06F 11/0751 |
| 2020/0128502 | A1* | 4/2020 | Alexander | H04Q 9/00 |
| 2020/0186600 | A1* | 6/2020 | Dawani | H04L 43/028 |
| 2020/0204574 | A1* | 6/2020 | Christian | G06F 18/23 |
| 2020/0213242 | A1* | 7/2020 | Zheng | H04W 28/065 |
| 2020/0257602 | A1* | 8/2020 | Crosby | G06F 18/24 |
| 2020/0259831 | A1* | 8/2020 | Pampati | H04L 63/0281 |
| 2020/0296007 | A1* | 9/2020 | Finn, II | H04L 41/145 |
| 2020/0314730 | A1 | 10/2020 | Kollar et al. | |
| 2021/0006638 | A1* | 1/2021 | Bhide | H04L 67/561 |
| 2021/0067613 | A1* | 3/2021 | Li | H04L 69/22 |
| 2021/0092127 | A1* | 3/2021 | Li | G06F 8/70 |
| 2021/0099394 | A1* | 4/2021 | Sharma | H04L 47/2483 |
| 2021/0153098 | A1* | 5/2021 | Kuenzi | H04L 45/122 |
| 2021/0160161 | A1* | 5/2021 | Scahill | H04L 43/04 |
| 2021/0160275 | A1* | 5/2021 | Anderson | H04L 63/1458 |
| 2021/0165731 | A1* | 6/2021 | Ross | G06F 21/577 |
| 2021/0194894 | A1* | 6/2021 | Anderson | H04L 63/1408 |
| 2021/0289552 | A1* | 9/2021 | Aboul-Magd | H04W 8/04 |
| 2021/0352516 | A1* | 11/2021 | Sawabe | H04W 28/10 |
| 2021/0385070 | A1* | 12/2021 | Watson | H04L 9/0894 |
| 2021/0385138 | A1* | 12/2021 | Watson | H04L 47/2441 |
| 2022/0014459 | A1* | 1/2022 | Ganguli | H04L 45/64 |
| 2022/0014963 | A1 | 1/2022 | Yeh et al. | |
| 2022/0021650 | A1* | 1/2022 | Moore | H04L 63/205 |
| 2022/0038949 | A1* | 2/2022 | Petria | H04W 28/04 |
| 2022/0046033 | A1* | 2/2022 | Tang | H04L 43/50 |
| 2022/0078072 | A1* | 3/2022 | Rayes | H04L 41/0813 |
| 2022/0094637 | A1* | 3/2022 | Dutta | H04L 45/04 |
| 2022/0104100 | A1* | 3/2022 | M | H04W 84/18 |
| 2022/0116302 | A1* | 4/2022 | Gupta | H04L 41/0893 |
| 2022/0131835 | A1* | 4/2022 | Fenton | H04L 63/1425 |
| 2022/0166663 | A1 | 5/2022 | Banka et al. | |
| 2022/0210170 | A1* | 6/2022 | Di Pinto | H04L 63/1416 |
| 2022/0224616 | A1* | 7/2022 | Andress | H04L 43/08 |
| 2022/0247505 | A1* | 8/2022 | Li | H04J 3/0697 |
| 2022/0247691 | A1* | 8/2022 | Xu | H04L 47/34 |
| 2022/0294880 | A1* | 9/2022 | Scahill | H04L 69/22 |
| 2022/0321566 | A1* | 10/2022 | Coyle | H04L 63/101 |
| 2022/0345931 | A1 | 10/2022 | Svennebring et al. | |
| 2022/0360531 | A1* | 11/2022 | Sudhan | H04L 47/781 |
| 2022/0385560 | A1* | 12/2022 | Dutta | H04L 45/26 |
| 2022/0394063 | A1* | 12/2022 | Pauly | H04L 63/205 |
| 2022/0394475 | A1* | 12/2022 | Busser | H04W 28/0252 |
| 2023/0006898 | A1* | 1/2023 | Albrecht | H04L 43/12 |
| 2023/0043492 | A1* | 2/2023 | Veijalainen | H04L 1/08 |
| 2023/0052712 | A1* | 2/2023 | Newell | H04L 43/04 |
| 2023/0053116 | A1* | 2/2023 | Uhling | H04W 40/246 |
| 2023/0059486 | A1* | 2/2023 | Ozkaptan | H04L 5/0082 |
| 2023/0121193 | A1* | 4/2023 | Busser | H04L 1/189 714/748 |
| 2023/0156069 | A1* | 5/2023 | Cundall | H04L 12/1831 |
| 2023/0156077 | A1* | 5/2023 | Jamil | H04L 67/1008 709/201 |
| 2024/0048466 | A1* | 2/2024 | Uzawa | H04L 69/28 |
| 2024/0193091 | A1* | 6/2024 | Park | G06F 3/067 |
| 2024/0193136 | A1* | 6/2024 | Chen | G06F 16/214 |
| 2024/0214323 | A1* | 6/2024 | Cheng | H04L 47/621 |
| 2024/0214431 | A1* | 6/2024 | Martinez de la Cruz | H04L 43/20 |
| 2024/0273086 | A1* | 8/2024 | Harting | H04L 43/106 |
| 2024/0291745 | A1* | 8/2024 | Chhabra | H04L 43/10 |
| 2024/0296254 | A1* | 9/2024 | Askerov | G06F 21/76 |
| 2024/0356825 | A1* | 10/2024 | Uzawa | H04L 43/04 |
| 2025/0182352 | A1* | 6/2025 | Wang | G06F 16/248 |

OTHER PUBLICATIONS

U.S. Appl. No. 18/055,470, Non-Final Office Action mailed May 6, 2025, 25 pages.

IEEE, "IEEE Standard for Local and Metropolitan Area Networks—Port-Based Network Access Control", In IEEE Std. 802.1X-2020 (Revision of IEEE Std 802.1X-2010 incorporating IEEE Std 802.1Xbx-2014 and IEEE Std. 802.1Xck-2018), Feb. 20, 2020, 289 pages, DOI: 10.1109/IEEESTD.2020.9018454.

* cited by examiner

TARGETED PDU CAPTURE BY A NETWORK DEVICE FOR ENHANCED WIRELESS NETWORK DIAGNOSTICS

BACKGROUND

The disclosure generally relates to transmission of digital information (e.g., CPC section H04L) and to monitoring or testing packet switching networks (e.g., CPC subsection H04L 43/00).

Capturing protocol data units ("PDUs"), often referred to as packet capture, is a commonly utilized technique that facilitates network traffic analysis through interception and logging of network traffic that traverses or crosses a boundary of a network. Generally, packet capture is enabled for a particular interface, such as a physical or logical network interface, to capture packets sent and received on that interface. Headers of captured packets with or without the corresponding data (e.g., Layer 3-7 payloads) are stored in a file. Packet analyzers are software- or hardware-based tools that can be employed to facilitate packet capture, writing data of captured packets to a file, and analysis of packets through reading from the file. Packet analyzers commonly utilize implementations of pcap, the application programming interface ("API") for packet capture. Packet analyzers often comprise functionality to produce a human-readable version of packet capture files for ease of analysis of network traffic.

BRIEF DESCRIPTION OF THE DRAWINGS

Aspects of the disclosure may be better understood by referencing the accompanying drawings.

DESCRIPTION

Figure 1:
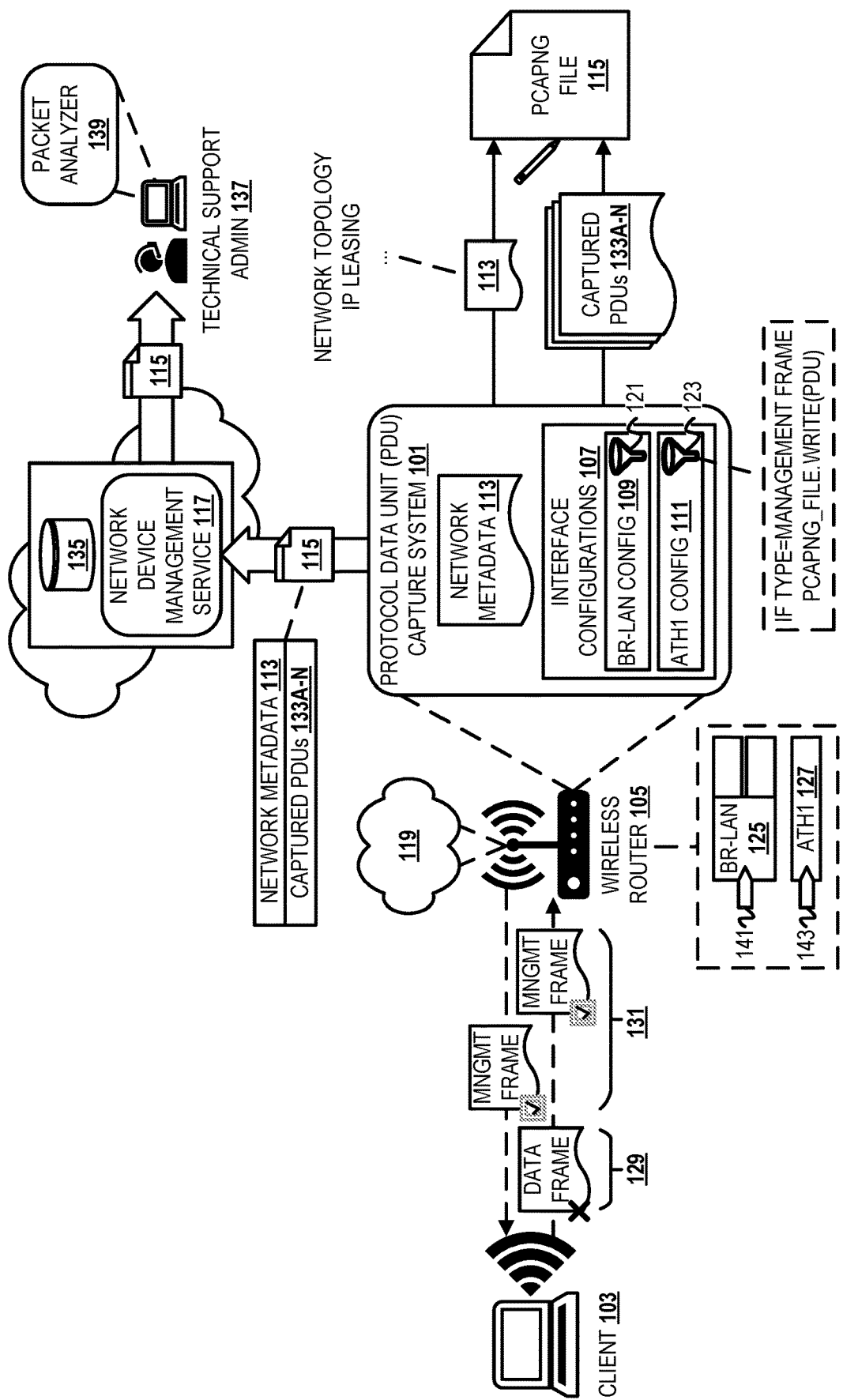
FIG. 1 is a conceptual diagram of selectively capturing PDUs for enhancing technical support operations.

The description that follows includes example systems, methods, techniques, and program flows that embody aspects of the disclosure. However, it is understood that this disclosure may be practiced without these specific details. For instance, this disclosure refers to a wireless network hardware configuration comprising a combined wireless router and modem in illustrative examples. Aspects of this disclosure can be also applied to a configuration comprising a standalone wireless router and modem, a standalone wireless access point, router, and modem, or another hardware configuration for a wireless network. In other instances, well-known instruction instances, protocols, structures and techniques have not been shown in detail in order not to obfuscate the description.

TERMINOLOGY

This description uses the term "PDU" to refer to a single unit of information transmitted between a source and a destination in network communications. A PDU is formatted in accordance with its associated communication protocol, and PDU formats vary across communication protocols at different layers in the protocol stack. For instance, a PDU can encompass a frame, a packet, and/or a segment/datagram for link layer/data link layer communication protocols, Internet layer/network layer communication protocols, and transport layer communication protocols, respectively. As used herein, a PDU can also encompass a message formatted in accordance with a communication protocol at a higher layer in the protocol stack (e.g., a Dynamic Host Configuration Protocol ("DHCP") message) or with a communication protocol using a format not listed.

This description uses shorthand terms related to cloud technology for efficiency and ease of explanation. When referring to "a cloud," this description is referring to the resources of a cloud service provider. For instance, a cloud can encompass the servers, virtual machines, and storage devices of a cloud service provider ("CSP"). In more general terms, a CSP resource accessible to customers is a resource owned/manage by the CSP entity that is accessible via network connections. Often, the access is in accordance with an application programming interface or software development kit provided by the CSP.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Though packet capture is a useful tool for network traffic analysis, it may pose challenges to network support professionals, such as information technology ("IT") admins or network engineers. For instance, enabling packet capture for an interface typically entails manual intervention by network support professionals. Some solutions necessitate the physical presence of a network support professional. Others involve configuration of user permissions and access arrangements to allow a network support professional to gain remote access to a device and manually configure the device for packet capture. Additionally, packet capture often does not target packet types of interest and instead captures any packet sent or received on an interface, which can be computationally expensive and inundates network support professionals with data for analysis that may include substantial noise. This is particularly the case for large or enterprise network systems having many network devices configured for packet capture. In other approaches for network traffic analysis, network logs can be leveraged. Network logs, however, introduce challenges of their own, as analysis of network logs to extract information of interest can be difficult and time consuming, and network logs comprise a fraction of the information that is provided by the contents of packets that can be obtained from packet capture.

Techniques for lightweight and targeted PDU capture for enhanced network connectivity diagnostics are disclosed herein. A network device with wireless access point capabilities selectively captures PDUs detected on one or more interfaces that have been instrumented (e.g., with raw sockets) to capture those of one or more types/subtypes "of interest," with those that are captured written to a PDU capture file having a known format. PDU types/subtypes that are treated as being "of interest" include those that are transmitted during a device's initial network activity during startup or attempted establishment of a wireless network connection. The interfaces instrumented for targeted PDU capture can include both wireless and wired (e.g., Ethernet) interfaces so that PDUs are captured at multiple points rather than on a single interface. This allows for insight into whether PDUs are being transmitted as expected that would be unavailable from PDU capture on a single interface and facilitates isolation of a reported connectivity issue to a particular interface. Additionally, the data that can be included in headers of captured PDUs can vary between PDUs captured on wireless interfaces and those captured on wired interfaces. Wireless interfaces having PDU capture enabled can be configured to associate additional data with captured PDUs in a header that is written to the PDU capture file, where the additional data pertains to the wireless network for which the connection is being established. Targeted capture of PDUs of interest is ongoing and occurs as a background process executing on the network device without the physical presence or intervention of a network support professional.

Prior to upload of a PDU capture file to a system from which it can be retrieved for analysis (e.g., in cloud storage), the network device adds network metadata to the packet capture file based on context of the environment in which the network device operates. Network metadata can include IP address and/or network topology information that can be determined at runtime based on tables maintained by the network device. The network metadata reflect information that a network support professional may request of customers seeking technical support to determine factors that may be influencing network connectivity and to which connectivity issues may be attributable. Upon retrieval of a PDU capture file generated for a customer for diagnosis of connectivity issues, this information is readily available with the PDU capture file(s) generated for the customer, which reduces the time and cost of network diagnostics for both customers and network support professionals. This is further facilitated by the use of recognized file formats for targeted packet capture since this allows for existing tools, such as open-source packet analyzers, to be employed to facilitate analysis of the captured PDUs.

Targeted PDU capture according to this technique can be further enhanced to streamline network troubleshooting and diagnostics for network support professionals and improve the experience of users having network connectivity issues both during initial connection attempts and after successfully establishing a network connection. To provide end users of network devices with the ability to configure their network devices for targeted PDU capture without the intervention of network support professionals, targeted PDU capture can be enabled on demand by end users rather than configured by network support professionals when end users experience issues establishing a network connection for Wi-Fi compatible devices. Upon experiencing an apparent network connectivity issue when attempting to connect a Wi-Fi compatible device with their network device, an end user can trigger targeted PDU capture through a software application that has been linked with the network device either directly or via a cloud service with which the network device can communicate. The network device initiates targeted PDU capture for a short-term period (e.g., 5-10 minutes), and the end user can recreate the activities that revealed the network connectivity issue while the network device generates the PDU capture file. The PDU capture file uploaded to the cloud service for further analysis thus comprises captured PDUs that are most relevant to the network connectivity issue, which further streamlines network diagnostics.

Once a device has successfully established a network connection via the network device, targeted PDU capture can facilitate detection of Wi-Fi roaming that negatively impacts throughput. The network device can remain configured to selectively capture PDUs corresponding to network connection attempts. At the same time, the network device writes estimated wireless throughput values calculated based on network statistics at brief increments of time (e.g., each second) to a pre-allocated buffer; once the buffer reaches its capacity, the network device begins overwriting the earlier-sampled throughput values with newer throughput values so the throughput values "wrap around" the buffer. When the network device detects a PDU(s) designated for capturing, the network device reads the contents of the buffer and writes the throughput values read from the buffer to the PDU capture file in addition to the captured PDU(s). This is because detection of management frames or other PDU types/subtypes sent and received during attempts to establish a network connection may be indicative of Wi-Fi roaming that diminishes network performance. Network support professionals can then evaluate the throughput values reported in the PDU capture file(s) to diagnose network issues that are attributable to Wi-Fi roaming.

Example Illustrations

FIG. 1 is a conceptual diagram of selectively capturing PDUs for enhancing technical support operations. A client 103, which is a Wi-Fi compatible device, is in range of a wireless router 105. The wireless router 105 transmits a wireless signal for a Wi-Fi network 119. The Wi-Fi network 119 is a wireless local area network ("WLAN") comporting to the Institute of Electrical and Electronics Engineers ("IEEE") 802.11 technical standards by which wireless clients can access the Internet. The wireless router 105 has been configured with a PDU capture system (hereinafter "the system") 101 that executes thereon. The system 101 may execute as a background process of the wireless router 105. The system 101 configures PDU capture for one or more interfaces of the wireless router 105 specified in interface configurations 107 that are attached to (i.e., installed on or otherwise accessible to) the system 101. Examples of interfaces that the system 101 can configure for PDU capture include wireless interfaces (e.g., interfaces corresponding to a wireless network interface card ("WNIC")), Ethernet/wired interfaces, loopback interfaces, and bridge interfaces.

In this example, the interface configurations 107 comprise a bridge interface configuration 109 for a bridge interface 125 named "BR-LAN" and a wireless interface configuration 111 for a wireless interface 127 named "ATH1" (i.e., an interface associated with a WNIC for Wi-Fi connections). The system 101 therefore captures PDUs received on the bridge interface 125 and the wireless interface 127 (collectively "the interfaces 125, 127") of the wireless router 105. The bridge interface 125 has a raw socket 141 bound thereto. The wireless interface 143 has a raw socket 143 bound thereto. The raw sockets 141, 143 may be declared and bound to respective ones of the interfaces 125, 127 via the bridge interface configuration 109 and the wireless interface configuration 111. Declaration and binding of the raw sockets to the interfaces 125, 127 instruments the interfaces 125, 127 for PDU capture. Raw sockets are used in particular because this socket type preserves headers of received PDUs, which allows the system 101 to write copies of each header of a captured PDU to a generated PDU capture file without stripping of headers corresponding to lower-level communication protocols.

The bridge interface configuration 109 and the wireless interface configuration 111 comprise a PDU filter 121 and a PDU filter 123, respectively. The PDU filters 121, 123, allow for capturing certain types and/or subtypes of PDUs that are generally communicated between clients and wireless routers or other devices that transmit a wireless signal during initial activities pertaining to establishing a network connection. These PDUs are likely to be associated with network traffic at times that the client is experiencing issues establishing a network connection. For instance, the PDU filter 121 and/or the PDU filter 123 may specify that the system 101 should capture IEEE 802.11 frames of the management frame type and may further specify one or more subtypes (e.g., association and authentication frames), messages carrying traffic for a four-way handshake (e.g., the IEEE 802.11i-2004 4-way handshake), Address Resolution Protocol ("ARP") messages of any type, and DHCP messages of any type.

The PDU filters 121, 123 indicate one or more criteria for capturing PDUs of a certain type(s) and/or subtype(s) that are detected on the respective ones of the interfaces 125, 127, such as based on metadata stored in PDU headers that can be evaluated by the system 101. In some examples, the PDU filters 121, 123 may be implemented with macros specified in declarations of the raw sockets 141, 143. A macro or other filter criteria indicated for each of the PDU filters 121, 123 may indicate one or more types of PDUs that should be effectively filtered out from PDU capture and omitted from the file that the system 101 generates. The system 101 will therefore write copies of PDUs received on either of the interfaces 125, 127 that are not filtered out by the respective ones of the PDU filters 121, 123, respectively, to the file with each header included along with the payload. Capturing certain types and/or subtypes of PDUs that satisfy the criteria set forth by the PDU filters 121, 123 reduces noise by omitting PDUs that are not particularly useful for network diagnostics so that troubleshooting can focus on the information that is pertinent.

The interface configurations 107 may also specify additional information that the system 101 should write to the file in association with captured PDUs of one or more types and/or subtypes (e.g., as an additional/supplemental header). As an example, the wireless interface configuration 111 may specify that upon detecting a PDU that should be captured per the PDU filter 123, the system 101 is to append an additional header comprising information about the Wi-Fi network 119 to the captured PDU and write the captured PDU with the additional header to the file. An example of such a header is a radiotap header, which can be enabled for wireless interfaces so that additional information about detected frames is captured along with the frames. Upon capture of a frame received on the wireless interface 127, the system 101 will write the frame header, data, and radiotap header to the capture file.

The system 101 also maintains network metadata 113. The network metadata 113 may be maintained in a file that the system 101 has downloaded (e.g., in a configuration file that the wireless router 105 has downloaded that at least partially implements the system 101), in a data structure(s) that the system 101 can update at runtime, in another data structure(s)/file(s) of the wireless router 105 that the system 101 can access, or a combination thereof. The network metadata 113 comprise information about the network environment in which the wireless router 105 operates. Examples of such information include information about topology of the network environment (e.g., indications of other network devices operating in range of the wireless router 105) and IP addresses of wireless clients connected to or in range of the wireless router 105. The system 101 may derive network topology information from a topology/neighbor table that the wireless router 105 maintains. If the wireless router 105 is configured with DHCP server functionality, the system 101 may determine assigned IP addresses based on a DHCP network table (also called a DHCP client table) of the wireless router 105.

Determination of the network metadata 113 may be ongoing or may be triggered by satisfaction of a criterion for uploading PDU capture files to a network device management service (hereinafter "the management service") 117 with which the system 101 can communicate. The management service 117 in this example is a cloud-based service with which the system 101 can communicate, such as a service(s) by which network devices can be configured with a PDU capture system and managed thereafter that is hosted in the cloud. The management service 117 may have established a secure connection with the wireless router 105 (e.g., a connection encrypted according to the Secure Sockets Layer ("SSL")/Transport Layer Security ("TLS") protocol) as part of configuring the wireless router 105 with the system 101. The criterion for uploading files may be a designated file size at which the file should be uploaded and/or expiration of a time period during which the system 101 captures PDUs (e.g., 10 or 15 minutes).

FIG. 1 depicts an example in which the system 101 generates a PDU capture file (hereinafter "the file") 115 based on targeted capture of PDUs received on the bridge interface 125 and the wireless interface 127. Targeted PDU capture by the system 101 can be triggered based on the system 101 detecting changes in network connectivity states of devices connected to or attempting to connect to the Wi-Fi network 119 (e.g., detected changes in a list of connected devices maintained by the wireless router 105). For instance, the system 101 can monitor network connection states/statuses tracked by the wireless router 105 and begin targeted PDU capture upon determining that a connection state or status has changed. Targeted PDU capture may alternatively be triggered upon configuration of the PDU filters 121, 123 and opening of the corresponding sockets. The file 115 is a Packet Capture ("PCAP") file or PCAP Next Generation ("PCAPNG") file that the system 101 creates. Once the file 115 is created, as PDUs that satisfy the criteria specified by the PDU filters 121, 123 are received on the interfaces 125, 127, the system 101 writes copies of the PDUs to the file 115. The file 115 also comprises one or more metadata fields that may be user-defined metadata fields. As the system 101 captures PDUs received on the interfaces 125, 127 that satisfy the criteria of the respective PDU filters 121, 123, the system 101 writes copies of captured PDUs, depicted as captured PDUs 133A-N, to the file 115. Each of the captured PDUs 133A-N comprises copies of data of the PDU (i.e., frame bodies/payloads) and any PDU headers with which the data were encapsulated. For those of the captured PDUs 133A-N that were received on the wireless interface 127 and satisfy the criteria indicated by the PDU filter 123 (e.g., management frames), the system 101 may also write a corresponding radiotap header or other header that stores information pertaining to the Wi-Fi network 119 to the file 115 in association with the frame header and data.

To illustrate, FIG. 1 depicts exemplary Layer 2 traffic communicated between the client 103 and the wireless router 105 during an attempt by the client 103 to connect to the Wi-Fi network 119. This traffic comprises 802.11 frames of two types: management frames 131 and a data frame 129. As described above, the PDU filter 123 corresponding to the wireless interface configuration 111 specifies that the system 101 should capture management frames received on the wireless interface 127 by writing copies of these PDUs to the file 115 while letting other PDU types pass without being captured. While not depicted in this example, the PDU filter 123 may further specify one or more subtypes of management frames to be captured (e.g., authentication frames, association frames, beacon frames, etc.). Therefore, the system 101 captures the management frames 131 (i.e., writes copies of the management frames 131 to the file 115) but does not capture the data frame 129. The captured PDUs 133A-N thus comprise the management frames 131 and may further comprise radiotap headers corresponding to the management frames 131 that the system 101 writes to the file 115.

Prior to upload of the file 115 to the management service 117 (e.g., upon satisfaction of an upload criterion), the system 101 also writes the network metadata 113 to the file 115. The PDU capture system 101 writes the network metadata 113 to the file 115 as values of the one or more metadata fields. Satisfaction of the upload criterion triggers uploading of the file 115 to the management service 117. The system 101 or the management service 117 associates an identifier by which the file 115 can be uniquely identified prior to storage of the file 115 in a repository 135 of PDU capture files. For instance, the system 101 may associate the media access control ("MAC") address of the NIC of the wireless router 105 and/or a serial number of the wireless router 105 with the file 115. The repository 135 into which the management service 117 inserts the file 115 maintains PDU capture files and may be indexed by device identifiers (e.g., MAC addresses and/or serial numbers). The management service 117 may maintain or have access to information about network device ownership by which network device MAC addresses and/or serial numbers indicated in the repository 135 are associated with customer identifiers, customer contact information, etc. The repository 135 may be maintained on the same cloud resource(s) as the management service 117 (e.g., the same virtual/physical server) or on a different cloud resource(s) to which the management service 117 has access.

Following upload and insertion into the repository 135, the file 115 is available to technical support or network administrators for analysis and diagnosis of network issues that the client 103 is experiencing. In implementations, the file 115 may be directly passed to a packet analyzer (e.g., that executes in the cloud) for at least a preliminary analysis of the captured PDUs before it is inserted into the repository 135. In this example, a technical support administrator 137 downloads the file 115 from the repository 135 (e.g., over a secure connection) and loads the file 115 into a packet analyzer 139. The packet analyzer 139 into which the file 115 is loaded can be an open-source or off-the-shelf packet analyzer. Formatting the file 115 with a standard, recognized file format for PDU capture and adding the network metadata 113 as metadata of the file 115 allows for compatibility with commonly employed packet analyzers. The metadata of the file 115 that comprises the network metadata 113 is also readily available at the time of retrieval of the file 115 and can be analyzed via a file analysis tool or other API, which provides the technical support administrator 137 with additional information about factors that may be impeding attempts by the client 103 to connect to the Wi-Fi network 119 that would not otherwise be available.

Figure 2:
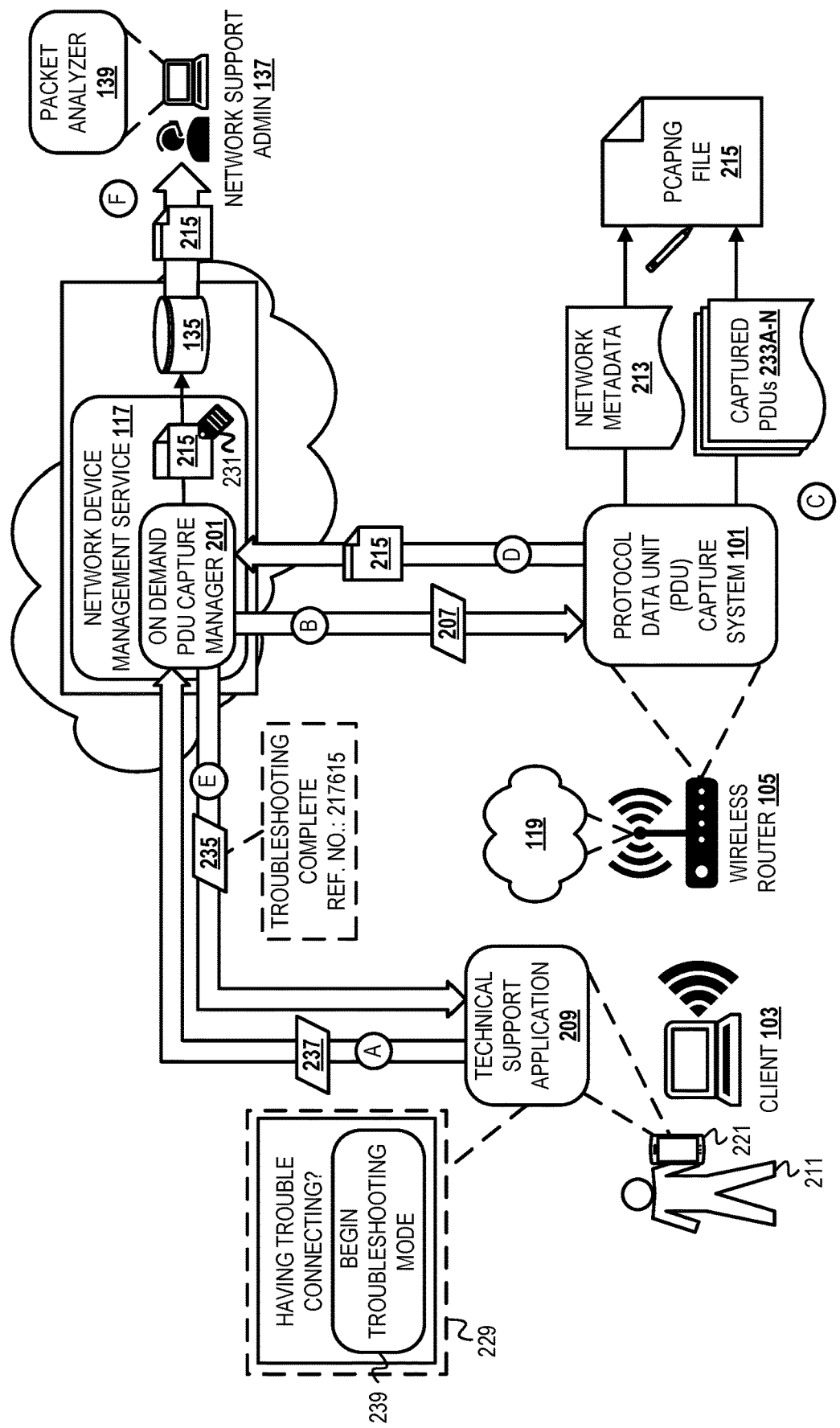
FIG. 2 is a conceptual diagram of targeted PDU capture that is triggered by a network device user or owner.

FIG. 2 is a conceptual diagram of targeted PDU capture that is triggered by a network device user or owner. In implementations of targeted PDU capture by a network device, PDU capture by the system 101 may be triggered by receipt of a request from a user/owner of the network device and thus can be considered to be offered on demand for expedited technical support. This contrasts with conventional solutions, in which the technical support administrator 137 would manually configure PDU capture for the wireless router 105 upon receipt of a request for technical support from the user 211. The system 101 is configured for targeted PDU capture as described in reference to FIG. 1 but is initially inactive. For instance, the system 101 may be installed on the wireless router 105 but in an inactive state.

For user-triggered targeted PDU capture, a user 211 of the client 103 utilizes a technical support application (hereinafter the "support app") 209 accessed via device 221, depicted as a smartphone, that can communicate with the management service 117. In particular, the management service 117 comprises an on demand PDU capture manager (hereinafter "the PDU capture manager") 201 with which the support app 209 can interface during sessions established therebetween. The support app 209 may be a mobile application offered by the management service 117 that has been downloaded to and installed on the device 221. As another example, the support app 209 may be offered as a Software-as-a-Service ("SaaS") application hosted in the cloud as part of or alongside the management service 117 that the user 211 accesses via the device 221. The support app 209 can communicate with the management service 117 and the PDU capture manager 201 over a secure connection (e.g., an SSL/TLS encrypted connection).

FIG. 2 is annotated with a series of letters A-F. These letters represent stages of operations. Although these stages are ordered for this example, the stages illustrate one example to aid in understanding this disclosure and should not be used to limit the claims. Subject matter falling within the scope of the claims can vary with respect to the order and some of the operations.

At stage A, the user 211 initiates submission of a support request 237 for the client 103 via the support app 209. The support application 209 has a graphical user interface ("GUI") 229 by which the user 221 can request technical support when experiencing difficulties connecting a wireless client to the wireless network for which their targeted PDU capture-compatible network device transmits a wireless signal (in this case, the client 103 and the wireless router 105). Technical support of targeted PDU capture-compatible network devices such as the wireless router 105 requested by a user begins with a brief (e.g., 10-15 minute) period of targeted packet capture by the system 101 for generation of an enhanced PDU capture file that can be associated with a technical support case generated for the user. This example depicts the GUI 229 as comprising a selectable GUI element 239 by which troubleshooting mode can be entered. Troubleshooting mode is used as exemplary language for the mode entered by the wireless router 105 when the user 211 requests technical support. Selection of this GUI element 239 by the user 211 (e.g., through clicking) prompts the support app 209 to generate and send the support request 237 to the PDU capture manager 201. The support request 237 comprises an identifier of the user 211 and/or the wireless router 105. For instance, the support app 209 may determine data associated with a login session and/or a profile, account, etc. of the user 211 when generating or submitting the support request 237 and include the identifying information of the user 211 and/or wireless router 105 with the support request 237 that is submitted to the PDU capture manager 201.

At stage B, the PDU capture manager 201 instructs the system 101 to begin targeted capture of PDUs. The PDU capture manager 201 sends a request 207 to the system 101 that triggers initiation of targeted PDU capture. The PDU capture manager 201 can identify the wireless router 105 as that to which to send the request 207 based on maintained session information for secure connections that the management service 117 has established with network devices having instances of the system 101 installed thereon. The request 207 indicates that the system 101 should enter troubleshooting mode during which it actively and selectively captures PDUs for a designated length of time (e.g., 10-15 minutes). The length of time for which targeted PDU capture should be enabled may be a configurable setting of the PDU capture manager 201. On receipt of the request 207 from the PDU capture manager 201, targeted PDU capture is enabled for the system 101 according to the targeted PDU capture configuration(s) that designates one or more interfaces of the wireless router 105. For instance, receipt of the request 207 may prompt the system 101 to become active. The PDU capture manager 201 may also notify the user 211 via the support app 209 that the system 101 has begun PDU capture and is in troubleshooting mode. The user 211 can thus manipulate the client 103 to recreate the activities during which it previously became apparent that the client 103 was unable to connect to the Wi-Fi network 119 (e.g., selecting the Wi-Fi network 119 from a list of available networks on the client 103, walking around a room while the client 103 attempts to discover the Wi-Fi network 119, etc.).

At stage C, the system 101 captures PDUs received on one or more interfaces of the wireless router 105 that have been instrumented for targeted PDU capture. The system 101 captures PDUs on the interface(s) of the wireless router 105 that are instrumented for PDU capture as described above in reference to FIG. 1 until the length of time indicated in the request 207 has expired. For instance, on receipt of the request 207, the system 101 may begin a timer set for the length of time. During this time, the system 101 captures PDUs 233A-N and writes copies thereof to a PDU capture file ("the file") 215, which is a file with a standard PDU capture file format (e.g., PCAP or PCAPNG). Expiration of the length of time (e.g., based on expiration of the timer) prompts the system 101 to stop capturing PDUs and upload the file 215 to the PDU capture manager 201. Before uploading the file 215, the system 101 writes network metadata 213 to the file 215. The system 101 may write the network metadata 213 to the file 215 on expiration of the length of time or another time during targeted PDU capture prior to expiration of the length of time.

At stage D, the system 101 uploads the file 215 to the PDU capture manager 201. The file 215 received by the PDU capture manager 201 is an enhanced PDU capture file that comprises the captured PDUs 233A-N and the network metadata 213. The system 101 or the PDU capture manager 201 associates an identifier by which the file 215 can be uniquely identified prior to storage of the file 215 in the repository 135 of PDU capture files (e.g., a MAC address of the wireless router 105 NIC and/or an identifier of the user 211). The PDU capture manager 201 may also create a technical support case for the user 211 that identifies the file 215 and queue the technical support case. In this example, the PDU capture manager 201 assigns a reference number to the case corresponding to the file 215 and associates the reference number with the file 215 as a label 231. Thus, creation of a technical support case upon request for troubleshooting by the user 211 is automated, and the created case is linked to the file 215. When opening the technical support case identified by the label 231, the technical support administrator 137 can subsequent query the repository 135 by case reference number to retrieve the file 215 for analysis.

At stage E, the PDU capture manager 201 informs the user 211 that troubleshooting mode is complete. The PDU capture manager 201 sends a notification 235 to the support app 209 that comprises the reference number of the case generated for the user 211. The support app 209 can then in response indicate to the user 211 via the GUI 229 that troubleshooting mode is completed and a support case has been created.

At stage F, the technical support administrator 137 analyzes the file 215 using the packet analyzer 139 to assist the user 211 in diagnosing connectivity issues that the client 103 may be experiencing. As with the file 115 of FIG. 1, the file 215 is formatted with a standard, recognized file format for PDU capture with the network metadata 213 added as metadata and is compatible with commonly employed packet analyzers as a result. As illustrated by this example, rather than the technical support administrator 137 manually configuring the wireless router 105 for PDU capture after receiving a support request submitted by the user 211, PDU capture was initiated by the user 211 upon experiencing difficulties with connecting the client 103 to the Wi-Fi network 119, and a technical support case was generated and queued without additional intervention by the technical support administrator 137.

Figure 3:
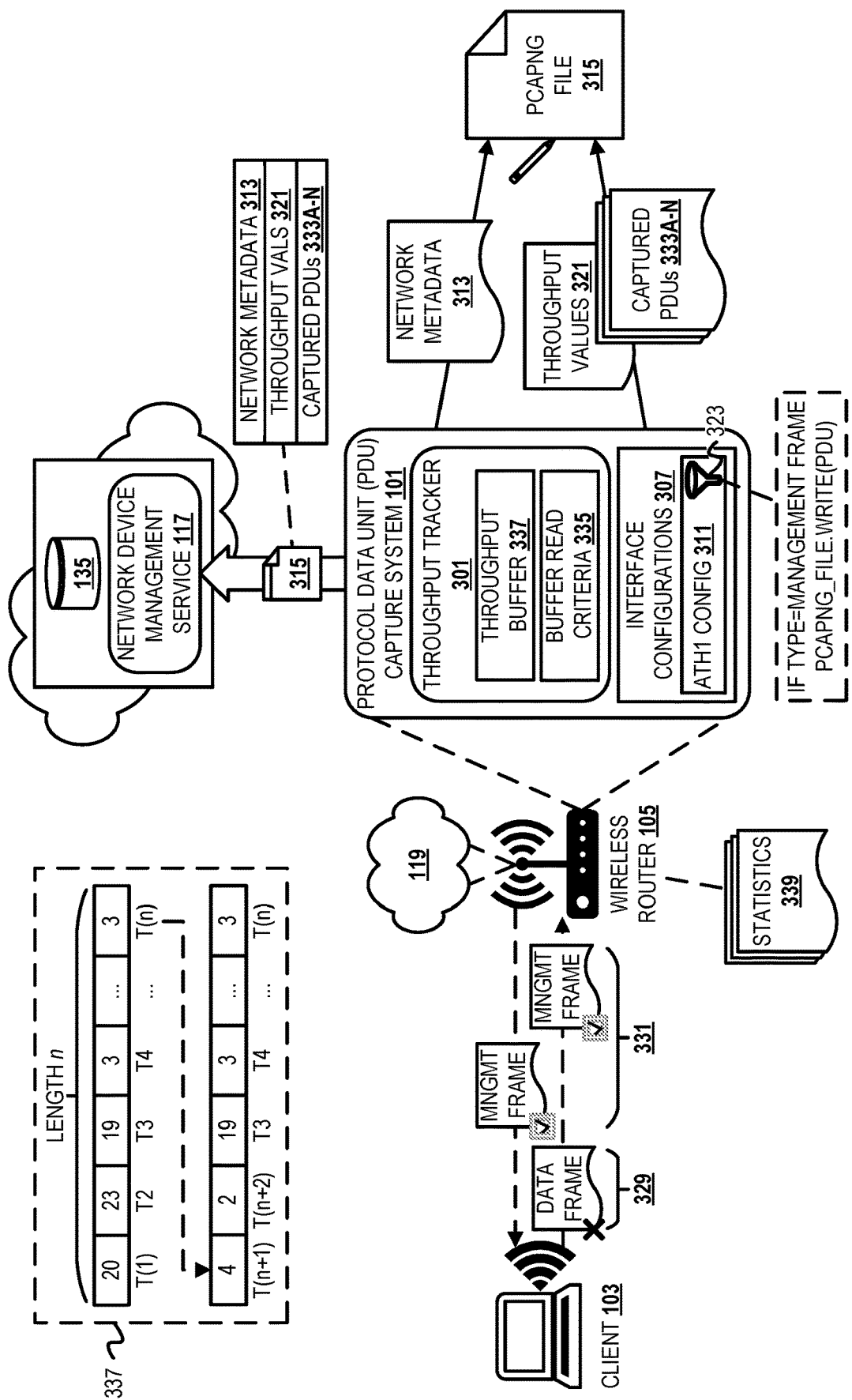
FIG. 3 is a conceptual diagram of selectively capturing PDUs to inform diagnosis of connectivity issues that may be attributable to Wi-Fi® roaming.

FIG. 3 is a conceptual diagram of selectively capturing PDUs to inform diagnosis of connectivity issues that may be attributable to Wi-Fi roaming. FIGS. 1 and 2 depicted examples in which the system 101 facilitated diagnosis of connectivity issues that may be experienced during initial attempts by the client 103 to detect and connect to the Wi-Fi network 119. As is now described in FIG. 3, the system 101 can also facilitate identification of Wi-Fi roaming that occurs after the client 103 has already established a connection to the Wi-Fi network 119 but is experiencing issues with the network connection. Wi-Fi roaming may occur when the Wi-Fi connection established by the client 103 moves between Wi-Fi frequency bands of the wireless router 105 (generally the 2.4 gigahertz (GHz) and 5 GHz frequency bands) or between the wireless router 105 and another network device comprising an access point (e.g., another wireless access point by which the client 103 can also connect to the Wi-Fi network 119). Throughput metrics values collected during a suspected roaming event serve to inform whether the slow connection is attributable to Wi-Fi routing or if there is another underlying cause.

On startup of the wireless router 105 after the system 101 has been installed thereon, a throughput tracker 301 of the system 101 initializes a throughput buffer 337 of a fixed size. The throughput buffer 337 is a data structure having a fixed size/length (e.g., an array). The throughput tracker 301 determines and records metric values, which at least comprise throughput values, for the Wi-Fi network 119 corresponding to the wireless router 105 at fixed time increments (e.g., each second) and stores the throughput and any other metric values in the throughput buffer 337. In implementations, additional network statistics or measurements can be determined and included in the throughput buffer 337 or recorded in another corresponding buffer(s), such as those of the network statistics based on which throughput is calculated (e.g., byte counts, port rates, etc.).

To determine the throughput, the throughput tracker 301 leverages statistics 339 recorded by the wireless router 105. The statistics 339 comprise network statistics recorded for network interfaces of the wireless router 105. These network statistics can comprise network statistics recorded for one or more interfaces of the wireless router 105 and/or for one or more logical ports via which a corresponding one or more client devices are connected to the wireless router 105. As an example, for network statistics corresponding to the wireless router 105 interface(s), the statistics 339 may comprise general interface statistics reported collectively for interfaces of the wireless router 105 or detailed interface statistics reported for one or more interfaces of the wireless router 105 for which targeted PDU capture is enabled. For network statistics corresponding to client devices connected to the wireless router 105, the statistics 339 may comprise network statistics recorded for one or more logical ports defined on an interface(s) of the wireless router 105, which at least should include a logical port on which the client 103 is connected. For instance, the throughput tracker 301 can read the byte count at each time increment from the interface statistics recorded for/by the wireless router 105, calculate the difference between the byte counts at consecutive time increments (i.e., for a current time increment n, the difference between byte counts recorded at time n and time n−1), and calculate throughput using the difference between byte counts and the length of the time increment. Separate throughput calculations may be performed for each distinct source of network statistics included in the statistics 339 if throughput is to be determined for both the interface(s) and port(s) of the wireless router 105. In other words, the throughput tracker 301 may compute first throughput values based on those of the statistics 339 corresponding to the wireless router 105 interface(s) (e.g., those reported for at least the wireless interface "ATH1") and second throughput values based on those of the statistics 339 corresponding to logical ports of the wireless router 105, including that on which the client 103 is connected to the wireless router 105. In this case, the throughput tracker 301 determines a first throughput for the wireless router 105 interface(s) and a second throughput for a client device(s) connected to a logical port(s) of the wireless router 105, with the throughput values distinguished with a respective interface identifier(s) and port name(s)/identifier(s). The throughput tracker 301 may convert byte count values to bits when leveraging these counts for the throughput calculation. Each element of the throughput buffer 337 may indicate a timestamp corresponding to the throughput value. Alternatively, or in addition, the throughput tracker 301 may maintain a pointer to the throughput buffer 337 that indicates the last-written entry that it updates as each throughput value is written to the throughput buffer 337. Once the throughput tracker 301 has filled the throughput buffer 337 to its capacity with throughput values determined for each time increment, the throughput tracker 301 begins overwriting throughput values at the start of the throughput buffer 337 such that the throughput values "wrap around" the throughput buffer 337. If the throughput tracker 301 is maintaining a pointer to the last-written entry of the buffer 337, the pointer reflects the most recent throughput value even after the wraparound so that the order in which throughput values were recorded can be extrapolated. For instance, the throughput buffer 337 may be implemented as a circular buffer.

To illustrate, FIG. 3 depicts the throughput buffer 337 as having a length n, where each element stores a throughput value that the throughput tracker 301 determines at consistent increments of time, such as each second. During its first pass through the throughput buffer 337, the throughput tracker 301 stores throughput values determined for the first n time increments (e.g., for each second of n seconds) T(1) through T(n). At time T(n+1), the throughput tracker 301 overwrites the value in the first element of the throughput buffer 337, thus storing the throughput value determined at time T(n+1) in the element that previously stored the throughput value determined at time T(1). Writing of throughput values to the throughput buffer 337 continues at incrementing entries until the throughput tracker 301 reaches the element that initially corresponded to time T(n), after which the throughput tracker 301 again begins wrapping around the throughput buffer 337. Storage of each throughput value in the throughput buffer 337 is thus temporary, and the throughput values stored in the throughput buffer 337 at any point in time indicate Wi-Fi throughput of the Wi-Fi network 119 calculated for the wireless router 105 for a period of n time increments.

The throughput tracker 301 also comprises one or more criteria 335 for reading from the throughput buffer 337 and writing the throughput values recorded therein to a generated PDU capture file. The criteria 335 specify at least a first PDU type and optionally a PDU subtype(s) that may be indicative of a Wi-Fi roaming event that, if captured by the system 101, trigger writing of values stored in the throughput buffer 337 to a PDU capture file generated by the system 101. In examples in which multiple interfaces of the wireless router 105 are instrumented for targeted PDU capture, the criteria 335 may indicate different criteria that should be applied for PDUs captured on each interface or may be applied across interfaces. The criteria 335 may be defined in terms of one or more PDU header fields (e.g., a header field indicative of PDU type/subtype). Generally, 802.11 management frames will be indicative of a potential Wi-Fi roaming event. As an example, when the client 103 roams while connected to the Wi-Fi network 119 via the 5 GHz frequency band of the wireless router 105, the client 103 may transmit a probe request frame(s) that the wireless router 105 receives on a channel(s) of the 2.4 GHz frequency band. In this case, the criteria 335 indicate capturing of 802.11 management frames of one or more subtypes as a criterion for writing the contents of the throughput buffer 337 to a PDU capture file. Since the type(s) of PDU specified by the criteria 335 may be similar to the PDU type(s) specified for either system-triggered PDU capture or user-triggered PDU capture as described in reference to FIG. 1 and FIG. 2, respectively, throughput capturing as described in FIG. 3 may be implemented alongside the aspects described in reference to these Figures.

The system 101 in this example comprises interface configurations 307 that include a wireless interface configuration 311 by which a wireless interface of the wireless router 105 is configured to selectively capture PDUs received thereon. The wireless interface configuration 311 may comprise a declaration for a raw socket that is bound to the wireless interface of the wireless router 105. The wireless interface configuration 311 comprises a PDU filter 323 that indicates that the system 101 should capture management frames received on the wireless interface of the wireless router 105 and allow other PDU types/subtypes to pass uncaptured. The PDU filter 323 may be implemented with a raw socket macro and/or criteria for PDUs received on the interface against which the system 101 can evaluate PDU headers.

FIG. 3 depicts an example in which the system 101 generates a PDU capture file (hereinafter "the file") 315, which is a PCAP or PCAPNG file, based on targeted capture of PDUs and ongoing monitoring of Wi-Fi throughput of the Wi-Fi network 119. As the system 101 captures PDUs received on the wireless interface of the wireless router 105 that satisfy the criteria of the PDU filter 323, the system 101 writes copies of the PDUs to the file 315, depicted in FIG. 3 as captured PDUs 333A-N. As the system 101 captures each of the captured PDUs 333A-N on the wireless interface of the wireless router 105, the system 101 may also write a corresponding radiotap header or other header that stores information pertaining to the Wi-Fi network 119 to the file 315 in association with the frame header and data. As with the similar example provided in reference to FIG. 1, since the wireless interface configuration 311 comprises a PDU filter 323 that specifies that management frames should be captured, the system 101 will capture management frames 331 transmitted between the client 103 and the wireless router 105 while allowing a data frame 329 to pass uncaptured. The captured PDUs 333A-N thus comprise the management frames 331.

As the system 101 captures PDUs on the interface(s) of the wireless router 105 that has been instrumented for targeted PDU capture (in this example, the wireless interface), the throughput tracker 301 determines whether a captured PDU satisfies the criteria 335. For instance, the throughput tracker 301 can determine whether the type and/or subtype of the PDU is designated by the criteria 335. Returning to the previous example in which the criteria 335 indicated that capturing of management frames is a trigger for writing contents of the throughput buffer 337 to a PDU capture file, the capture of the management frames 331 prompts the throughput tracker 301 to write throughput values 321 that comprise the contents of the throughput buffer 337 to the file 315. The throughput tracker 301 may write the throughput values 321 to the file 315 as metadata of the file that indicate throughput of the Wi-Fi network 119 around the time that the captured PDUs 333A-N were detected. The throughput tracker 301 may also write any timestamps corresponding to the elements of the throughput buffer 337 and/or a position of a pointer to the last-written entry to the file 315 with the throughput values 321.

Satisfaction of the criteria 335 indicates that a Wi-Fi roaming event may have occurred and thus may trigger upload of the file 315 to the management service 117 for storage in the repository 135 for subsequent analysis. Prior to uploading the file 315 to the management service 117, the system 101 associates network metadata 313 with the file 315 as described in reference to FIGS. 1 and 2. The file 315 that the system 101 uploads to the management service 117 and that is stored in the repository 135 thus comprises the captured PDUs 333A-N along with the throughput values 321 and the network metadata 313. If a user/owner of the client 103 submits a technical support request indicating that they are experiencing a slow connection when sending and receiving data over the Wi-Fi network 119, the file 315 can then be retrieved for analysis to determine whether the throughput values 321 indicate that the client 103 is roaming and the poor user experience is thus attributable to Wi-Fi roaming or if there is another cause of the poor user experience.

In implementations, the system 101 may provide for creation and upload of multiple enhanced PDU capture files instead of one PDU capture file as illustrated by FIGS. 1-3. The system 101 may create multiple PDU capture files so that each file corresponds to captured PDUs of a same type (e.g., in terms of associated communication protocol and/or protocol layer). Alternatively, or in addition, the system 101 may create multiple PDU capture files that correspond to multiple wireless clients that the system 101 distinguishes based on MAC address so that a PDU capture file is created for each unique wireless client. As an example, the system 101 may write captured DHCP messages to a PDU capture file dedicated to DHCP traffic for one or more wireless clients. An additional PDU capture file may be dedicated to PDUs captured for a single wireless client. The system 101 can write each captured PDU to one or more of the multiple PDU capture files; with respect to the previous example, DHCP messages that indicate the wireless client of interest can be written to both of the PDU capture files. The system 101 writes network metadata to each of the resulting PDU capture files that it uploads to the management service 117 for access by network support professionals.

FIGS. 1-3 depict examples in which one network device, a wireless router 105, has an instance of the system 101 installed thereon by which it selectively captures PDUs. In implementations, multiple network devices that comprise an access point that provide access to the same wireless network can have respective instances of the system 101 installed thereon. The management service 117 may have knowledge of the network devices that provide access to the same wireless network based on records maintained for deployed network devices and/or based on account information associated with users/owners of the network devices. In these cases, the management service 117 facilitates or orchestrates targeted PDU capture across the network devices. For instance, referring to FIG. 2, when the user 211 initiates submission of a support request that triggers targeted PDU capture, the support app 209 may prompt the user 211 to select for which of the registered network devices the user 211 would like to request support. For instance, the GUI 229 may indicate a list of network devices that identifies the network devices by name assigned by the user 211. The user 211 may select one or more of the available network devices to enter troubleshooting mode (i.e., begin targeted PDU capture). The support request 237 that the PDU capture manager 201 receives would thus indicate the selected network device(s) (e.g., based on the associated MAC address, device name, etc.). The PDU capture manager 201 would then instruct the selected network device(s) to begin targeted PDU capture for the length of time at stage B and would receive an enhanced PDU capture file(s) from the selected network device(s) upon expiration of the length of time at stage D. As another example, with respect to FIG. 3, multiple network devices can be configured with instances of the system 101 that comprise the throughput tracker 301. As PDUs that are indicative of potential roaming events are captured on one or more interfaces of the network devices, the corresponding instance(s) of the system 101 write the PDUs and corresponding throughput values to a PDU capture file(s). If more than one of the network devices received a PDU(s) that may have been associated with Wi-Fi roaming, the management service 117 will receive multiple PDU capture files from respective instances of the system 101. On analysis of the PDU capture files, the throughput values included between/across the PDU capture files can be correlated with each other to identify roaming between the network devices. If the management service 117 obtains multiple PDU capture files for a same network environment (i.e., the wireless network to which the network devices provide access), the management service 117 can correlate the PDU capture files with each other in the repository 135. For instance, the management service 117 can utilize the same index for each of the PDU capture files (e.g., the same owner/user identifier).

FIGS. 1-3 refer to instrumenting an interface of a network device for PDU capture by declaring a raw socket and binding the raw socket to the interface. In implementations, Netlink sockets may be used as an alternative or in addition to raw sockets. Netlink sockets can contribute to capturing information pertaining to wireless connections, particularly with respect to capturing messages that correspond to events generated by a network device on which the system 101 executes. As an example, a network environment may comprise two wireless access points between which a wireless network connection is established, where one of the wireless access points acts as a base station for the other access point via a wireless uplink. Network traffic can be sent between the wireless access points via this connection, so information about the wireless uplink between the two access points may be useful in the event that a wireless client attempting to establish a network connection in this environment is experiencing difficulties. If an implementation of the system 101 is executing on a wireless access point in such a network environment and a wireless interface of the wireless access point has been instrumented with a Netlink socket, the system 101 can generate a Netlink message via the Netlink socket and write the Netlink message to a PDU capture file. The Netlink message added to the PDU capture file may comprise the signal strength, data rate, and/or packet error rate associated with the wireless uplink for the two wireless access points. Generation and capturing of Netlink messages by the system 101 may be periodic and may be triggered by the system 101 determining that the network environment is one that comprises a wireless uplink between a first wireless access point on which it executes and a second, neighboring wireless access point (e.g., based on a topology table of the first wireless access point).

Figure 4:
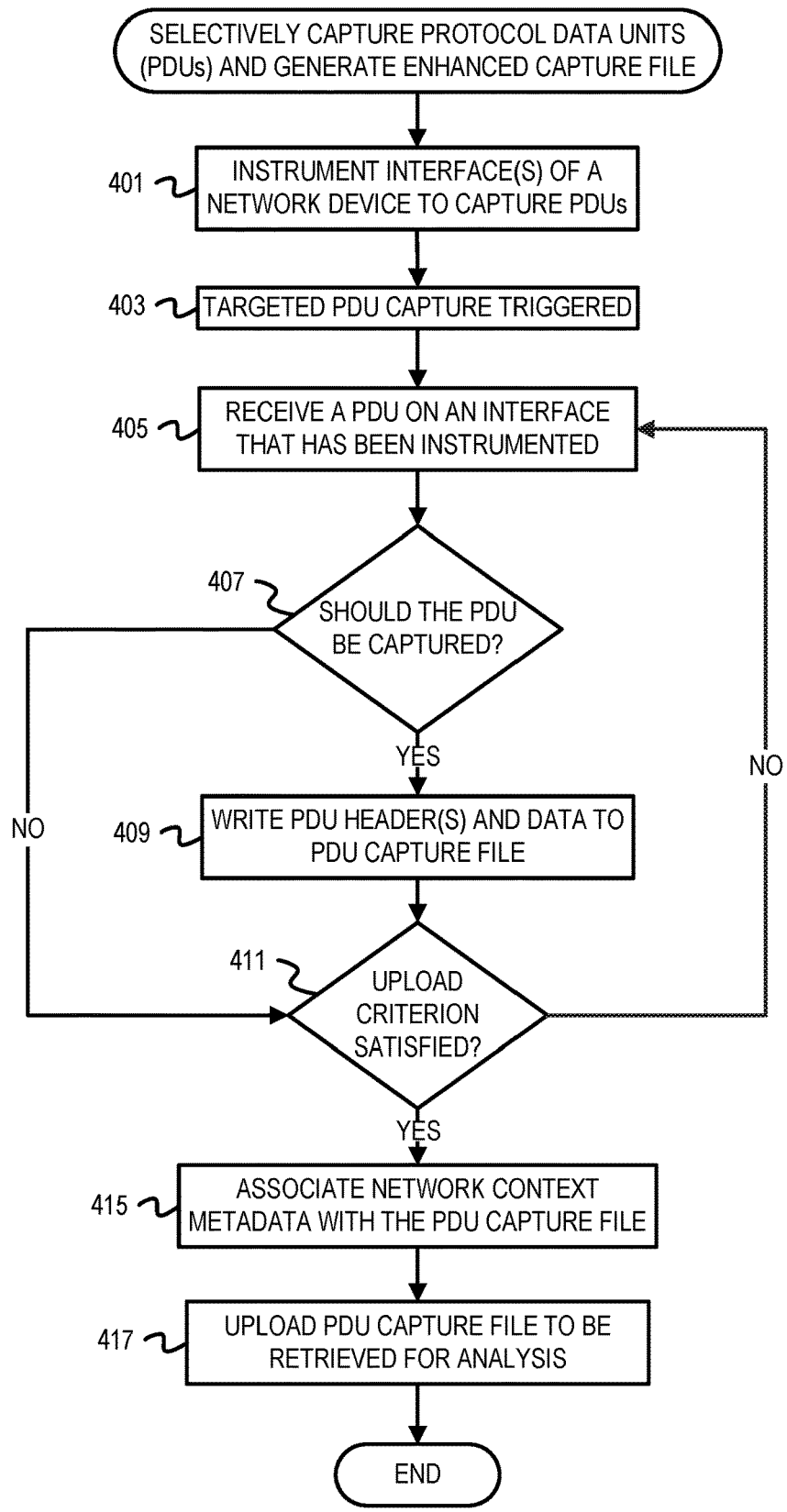
FIG. 4 is a flowchart of example operations for selectively capturing PDUs and generating an enhanced capture file.
Figure 5:
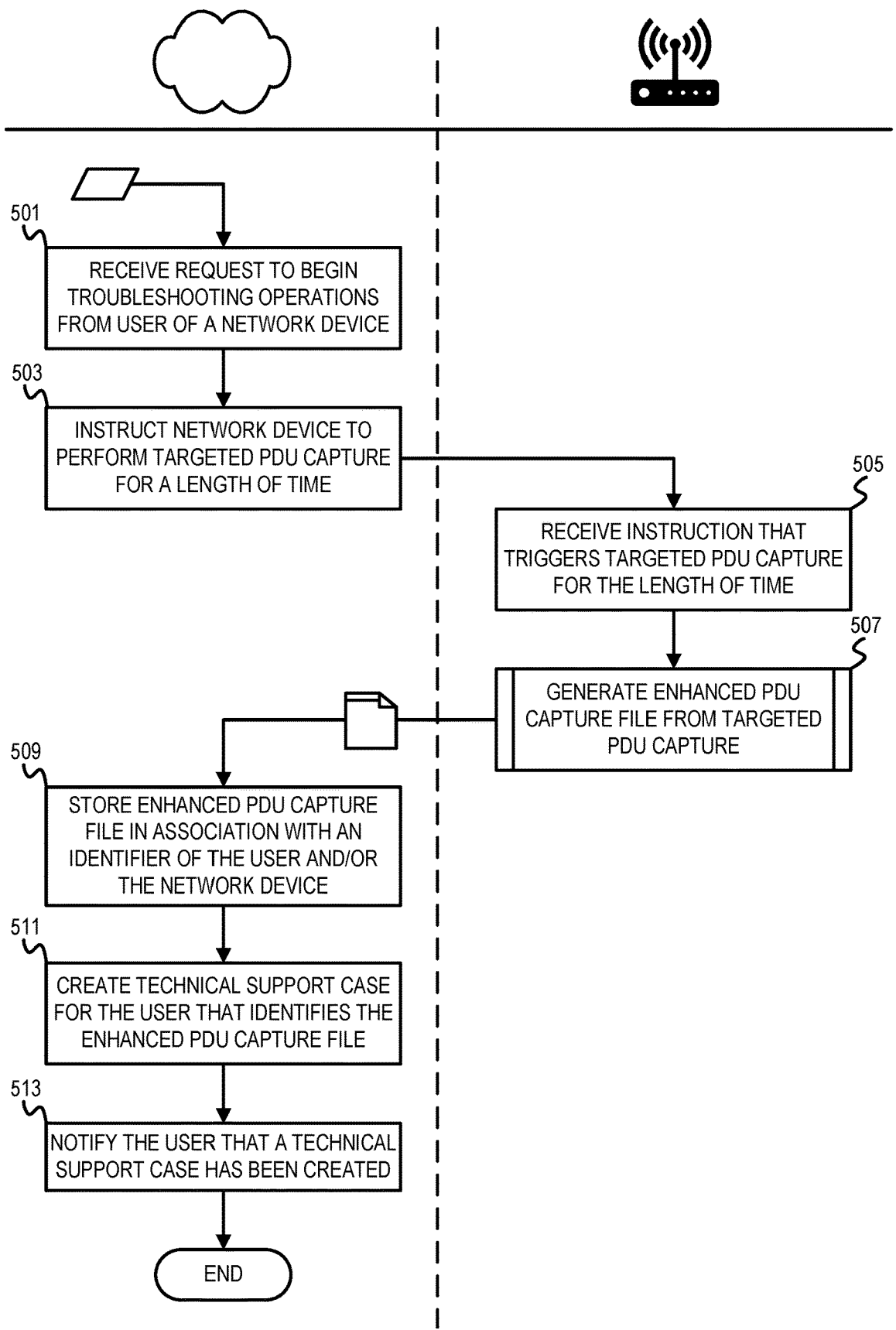
FIG. 5 is a flowchart of example operations for performing targeted packet capture on demand to facilitate network diagnostics requested by an end user of a wireless client.
Figure 6:
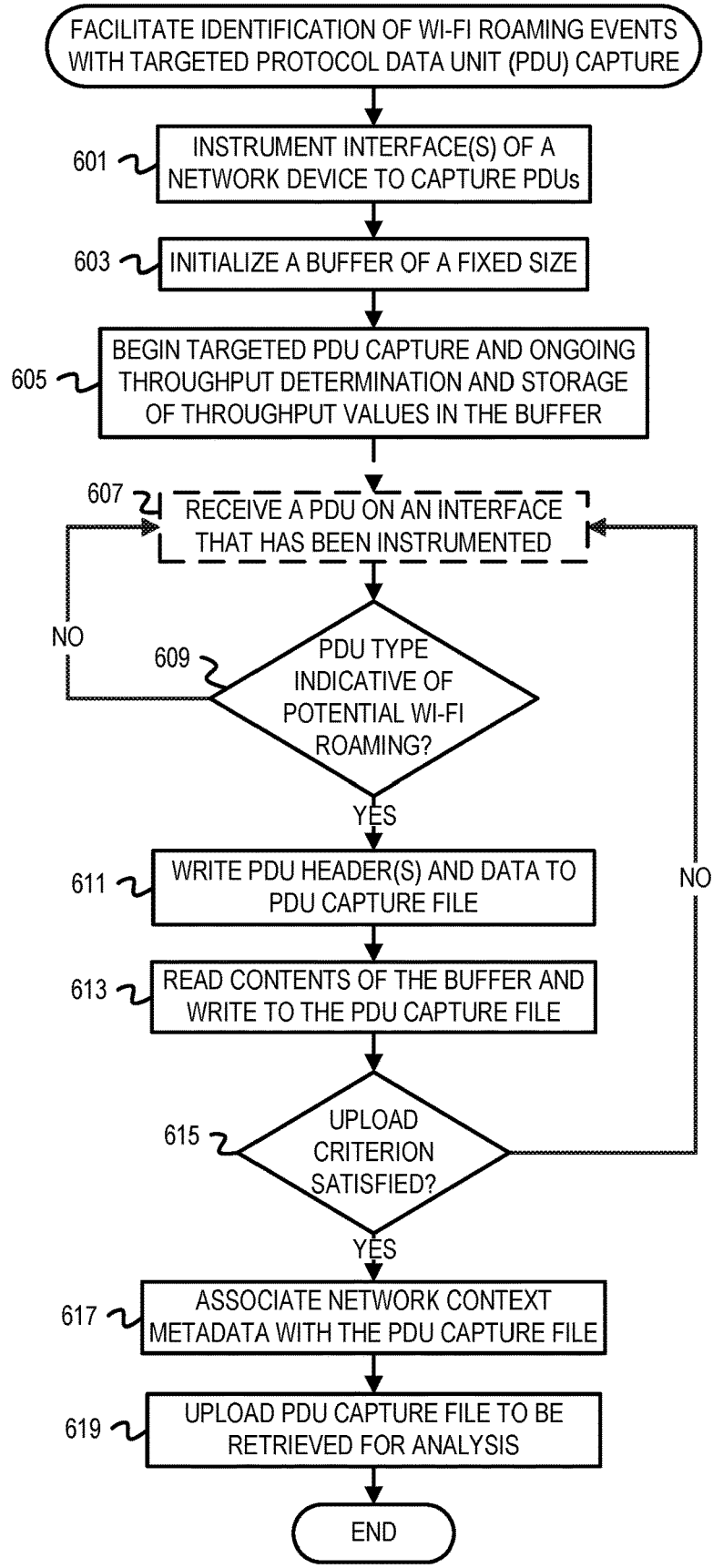
FIG. 6 is a flowchart of example operations for facilitating identification of Wi-Fi roaming events with targeted PDU capture.

FIGS. 4-6 are flowcharts of example operations for targeted packet capture by a network device for enhanced wireless network diagnostics. The example operations are described with reference to a PDU capture system and/or a network device management service (hereinafter "the system" ands "the management service," respectively). for consistency with the earlier figures. The system executes as part of a network device that comprises a wireless access point, such as a wireless router. When referencing "the network device," the example operations are referring to the network device on which the system executes. The management service may execute on a physical or virtual instance, such as a cloud instance. The management service and the system may communicate over a secure connection, such as an SSL/TLS encrypted connection established as part of configuration of the network device with the system. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 4 is a flowchart of example operations for selectively capturing PDUs and generating an enhanced capture file. At block 401, the system instruments one or more interfaces of a network device to capture PDUs. Installation of the system on the network device also installs a configuration(s) of one or more interfaces of the network device on which received PDUs are to be captured. Each interface to be configured for targeted PDU capture may be of any type, such as a wireless interface (i.e., a wireless NIC), a bridge interface, a wired interface (e.g., an Ethernet interface), or a loopback interface. The interface(s) can be identified in the respective configuration(s) with a name(s)/identifier(s) of the interface(s). The system instruments each of the identified interfaces by declaring a socket, which will generally be a raw socket, and binding the raw socket to the interface. The system may bind the raw socket to an interface by binding the raw socket on the logical port opened on the interface for connections. In implementations, Netlink sockets may be declared and bound to an interface(s). If the configuration specifies the wireless interface of the network device for instrumentation, the system may further instrument the wireless interface by enabling radiotap headers for the interface.

At block 403, targeted PDU capture by the system is triggered. Targeted PDU capture by the system may be triggered by boot of the network device on which the system executes or upon opening/configuration of sockets (e.g., raw sockets) for interfaces of the network device on which received PDUs are to be captured.

At block 405, the system receives a PDU on an instrumented interface of the network device. When the interface is instrumented with a raw socket, the PDU is received on the raw socket bound to the interface and intercepted by the system. The headers with which the PDU has been encapsulated will not be stripped from the PDU data as a result of the use of raw sockets. The PDU received on the interface may correspond to incoming traffic or outgoing traffic (i.e., traffic originating from a client or traffic destined for a client, respectively).

At block 407, the system determines if the PDU should be captured. Each of the interface configurations designates one or more types of PDUs that the system should capture in a PDU capture file. For instance, the configuration corresponding to the interface on which the PDU was received may designate DHCP messages as the PDU type to be captured. The type(s) of PDU designated for each interface may be the same or differ across interfaces. The corresponding interface configuration may further designate one or more subtypes of PDUs that the system should capture. For instance, an interface configuration may designate 802.11 management frames as the PDU type to be captured and beacon frames, probe request frames, etc. as the subtypes to be captured. The system determines whether a type of the PDU is designated for capturing for the interface based on the respective configuration of the interface. The system may determine the type and optionally the subtype of the PDU based on a header(s) of the PDU that indicates the communication protocol according to which the PDU was sent. If the PDU type or type/subtype are designated for capturing by the interface configuration, the system determines that the PDU should be captured. If the PDU should be captured, operations continue at block 409. Otherwise, the system allows the PDU to pass for processing, and operations continue at block 411.

At block 409, the system writes the PDU, including the data and the PDU header(s) corresponding to any layer of the protocol stack, to a PDU capture file. The PDU capture file is a PCAP or PCAPNG file having a standard format used for capturing PDUs. The system writes the "raw" PDU to the PDU capture file such that any headers of the PDU as well as the payload/data are written to the file. If the PDU is the first PDU that the system has intercepted and determined should be captured, the system first creates the PDU capture file and writes the PDU to the file. Additionally, the system may create and write to multiple PDU capture files that correspond to respective wireless clients (e.g., based on client MAC addresses) and/or PDU types. In this case, the system writes the PDU header(s) and data to the appropriate PDU capture file that corresponds to the wireless client and/or PDU type that can be ascertained from the header(s) of the captured PDU.

At block 411, the system determines if at least a first upload criterion is satisfied. The upload criterion may be an established criterion that is based on a schedule and/or another triggering condition for uploading a PDU capture file to a server (e.g., a virtual server running in a cloud environment), such as a size of the PDU capture file exceeding a threshold. If the upload criterion is not satisfied, operations continue at block 405 when another PDU is received on an interface instrumented for PDU capture, which may be the same interface or a different interface. If the upload criterion is satisfied, operations continue at block 415.

At block 415, the system associates network context metadata with the PDU capture file. The network context metadata indicate a context of the network environment in which the network device operates and can comprise information determined by the system at runtime and/or information with which the system has been configured. Examples of network context metadata include network topology information and assigned IP addresses in the network environment. For instance, the system can determine network topology information at runtime based on a neighbor table and/or a topology table maintained by the network device. The system can determine IP address assignments based on a DHCP network table maintained by the network device. The PDU capture file can comprise one or more user-defined metadata fields with which the system associates the corresponding network context metadata. Alternatively, or in addition, the system may label, tag, or otherwise associate the PDU capture file with the network context metadata. If the system has created multiple PDU capture files, the system associates the network context metadata with each of the PDU capture files.

At block 417, the system uploads the PDU capture file (including the network context metadata) to be retrieved for analysis. Uploading the PDU capture file may include uploading the file to a server with which the system has established a secure connection (e.g., a virtual server running on a cloud instance) on which the management service executes. If the system has created multiple PDU capture files, the system uploads each of the PDU capture files. Before uploading the PDU capture file, the system may attach (e.g., through labeling, tagging, etc.) an identifier of the network device and/or an owner/user of the network device to the PDU capture file. The management service can then insert the PDU capture file into a repository of capture files from which it can be retrieved for subsequent analysis, such as with a packet analyzer. The network context metadata will also be visible to the entity performing the analysis.

FIG. 5 is a flowchart of example operations for performing targeted packet capture on demand to facilitate network diagnostics requested by an end user of a wireless client. FIG. 5 depicts example operations that are performed by the management service that may execute on a cloud instance and by the system that executes on a network device with wireless access point capabilities. In particular, the management service is described as performing the example operations depicted at blocks 501-503 and blocks 509-513, and the system is described as performing the example operations depicted at blocks 505-507. The example operations assume that the network device has already been instrumented for targeted PDU capture as similarly described in reference to FIG. 4 at block 401 but has not actively begun capturing PDUs. For instance, the system may be in an inactive or disabled state at the time that the example operations commence.

At block 501, the management service receives a request to begin troubleshooting operations from a user of a network device. The user may submit a request for troubleshooting/support from a client device different from that which is experiencing connectivity issues, such as via a software application installed on the client device or accessed over the Internet (e.g., if offered as a SaaS application) by which the user can submit requests after session establishment. The request may indicate an identifier of the requestor (e.g., a username/user identifier associated with the account from which the request originated) and/or an identifier of one or more network devices associated with the requestor (e.g., a name(s) assigned to or serial number of the network device(s)) if the user was prompted to select a network device from a set of available network devices.

At block 503, the management service instructs the network device to perform targeted PDU capture for a length of time. The management service communicates an instruction to begin targeted PDU capture to the system over a secure connection established with the system. The instruction indicates the length of time and activation of targeted PDU capture by the system. The length of time is a preconfigured time interval of the management service (e.g., a 5-10 minute period).

At block 505, the system receives the instruction from the management service that triggers targeted PDU capture for the length of time. The system receives the instruction over the secure connection and can determine the length of time designated therein. Receipt of the instruction may trigger the system to begin a timer during which it performs targeted PDU capture according to the configuration of one or more network interfaces installed thereon.

At block 507, the system generates an enhanced PDU capture file from targeted PDU capture that it performs for the length of time. Generation of the enhanced PDU capture file proceeds as described in reference to blocks 405-417 of FIG. 4, where the upload criterion is expiration of the timer established for the length of time specified for targeted PDU capture. On expiration of the timer, the system uploads an enhanced PDU capture file that comprises PDUs that were captured during the length of time and the network context metadata.

At block 509, the management service stores the enhanced PDU capture file in association with an identifier of the user and/or network device. The management service may store the file in a database or repository that is indexed by identifiers of users and/or network devices that have an account (e.g., network device serial numbers). The identifier(s) may have been determined from the user's request received at block 501 and/or may be determined from account information accessed for the user.

At block 511, the management service creates a technical support case for the user that identifies the enhanced PDU capture file. Creation of the technical support case can include queueing the user and/or network device identifier(s) by which the file can also be retrieved in a queue of support cases. The management service may also assign a case number to the technical support case, which can correspond to its initial position in the queue. When a network support administrator begins reviewing the technical support case, the administrator can retrieve the enhanced PDU capture file from the database or repository based on the user and/or network device identifier(s) that are associated with the case number.

At block 513, the management service notifies the user that a technical support case has been created. The management service may communicate a notification to the user that the user receives on the session endpoint corresponding to the software application that the user has accessed via the client device. The notification may prompt the client device to indicate via a GUI that the technical support case has been created. The notification may further indicate a case number or other identifier of the technical support case created for the user.

FIG. 6 is a flowchart of example operations for facilitating identification of Wi-Fi roaming events with targeted PDU capture. Wi-Fi roaming events that can be identified based on targeted PDU capture as described herein include both Wi-Fi roaming between frequency bands (e.g., between the 2.4 GHz and 5 GHz frequency bands) and between different network devices that provide wireless network access (e.g., between a wireless router and an access point). The example operations describe determining network throughput based on network statistics recorded by a network device. In implementations, additional network statistics and/or measurements can be determined or calculated.

At block 601, the system instruments one or more interfaces of a network device to capture PDUs. Instrumentation of a network device interface(s) can be performed as similarly described in reference to FIG. 4 at block 401. For instance, installation of the system on the network device can include installation of a configuration of the network device that comprises configurations of one or more interfaces of the network device on which received PDUs are to be captured. Each interface to be configured for targeted PDU capture may be of any type, such as a wireless interface (i.e., a wireless NIC), a bridge interface, a wired interface (e.g., an Ethernet interface), or a loopback interface. The interface(s) can be identified in the respective configuration(s) with a name(s)/identifier(s) of the interface(s). The system instruments each of the identified interfaces by declaring a socket, which will generally be a raw socket, and binding the raw socket to the interface. The system may bind the raw socket to an interface by binding the raw socket on the logical port opened on the interface for connections. In implementations, Netlink sockets may be declared and bound to an interface(s). If the configuration specifies the wireless interface of the network device for instrumentation, the system may further instrument the wireless interface by enabling radiotap headers for the interface.

At block 603, the system initializes a buffer of a fixed size. The buffer can be implemented as a data structure having a size of n, where n corresponds to a number of throughput values that can be stored in the data structure (e.g., an array of length n, a circular buffer with n elements, etc.). The size n is value with which the system was preconfigured. Each entry or element of the data structure that stores a throughput value corresponds to a time increment such that the data structure stores throughput values corresponding to an interval of time at any given point. As an example, for a data structure where n=20 in which throughput values are stored each second, when filled to capacity, the buffer comprises throughput values observed over a 20 second period. If multiple network statistics/measurements are being determined for each time increment, the system may initialize a corresponding number of buffers or may initialize the throughput buffer to include a corresponding number of additional fields/properties for each entry of the data structure.

At block 605, the system begins targeted PDU capture and ongoing throughput determination and storage of determined throughput values in the buffer. The system has access to network statistics of interfaces and/or ports, including logical ports, of the network device. The network statistics available to and utilized by the system to determine throughput can correspond to each interface of the network device, the set of interfaces of the network device, and/or of each port (e.g., logical port) defined for the network device. Example network statistics reported for each of these sources include transmitted and received packet counts and byte counts as well as port input/output rates (e.g., in bits per second). Targeted PDU capture may be triggered at boot of the network device on which the system operates or by receipt of an instruction to capture PDUs for a length of time over a secure connection as described in reference to FIGS. 2 and 5. The system determines metric values that at least include Wi-Fi throughput at fixed increments of time, such as each second, where the fixed increment of time can be preconfigured or received in an instruction to begin throughput-informed, selective PDU capture (e.g., as described in reference to FIG. 2). The system can determine throughput at each time increment based on reading from the network statistics at each time increment and calculating throughput based on the identified values. Throughput can be determined for each interface and/or port of the network device for which the system has statistics available such that the system determines and stores throughput values for each of the network device interface(s) and port(s). As an illustrative example of throughput determination based on network statistics by the system, the system can read the byte counts at each time increment and calculate the throughput for each time increment based on the byte count read for time n, the byte count read for time n−1, and the length of the time increment (with bytes optionally converted to bits); for a time increment of one second, the throughput can be calculated based on the currently-recorded byte count and the byte count read from the recorded statistics at the previous second. The time increment may have a default value based on time increments associated with the network statistics, such as if byte counts are represented with bytes per second. If the time increment of throughput determination differs from the time increment associated with the network statistics, the system can aggregate statistics readings so that the time increments of the statistics themselves and of the throughput calculations are in correspondence with each other. Further, if multiple throughput and other metric values are being determined at each time increment (e.g., interface throughput and throughput for at least one port), the system may record interface and/or port identifiers for each determined value in the corresponding element of the buffer or may create and maintain buffers for each corresponding source of the recorded values.

As the system determines the throughput of the network device at each time increment, the system writes the throughput to the buffer. The position at which the system writes the throughput value may be represented as the modulo of the current time increment t and the size n of the buffer. For instance, consider an example in which the system captures throughput values each second such that the time increment is one second, where t is an elapsed number of seconds since commencement of recording throughput values, and writes each throughput value to the buffer. The position of the buffer at which the system writes a throughput value observed in this example is one plus the modulo of (t−1) and n (if the buffer uses one-based indexing) or the modulo of (t−1) and n (if the buffer uses zero-based indexing); this is represented mathematically as (t−1) mod n+1 or (t−1) mod n, respectively.

At block 607, the system receives a PDU on an interface that has been instrumented. As described in reference to FIG. 4, when the interface is instrumented with a raw socket, the PDU is received on the raw socket bound to the interface and intercepted by the system. The headers with which the PDU has been encapsulated will not be stripped from the payload/data as a result of the use of raw sockets. The PDU received on the interface may correspond to incoming traffic or outgoing traffic (i.e., traffic originating from a client or traffic destined for a client, respectively).

At block 609, the system determines whether the PDU type is indicative that Wi-Fi roaming is potentially occurring for a client connected to the network device. PDU types that are indicative of a potential roaming event include 802.11 management frames that are transmitted during network discovery and connection establishment. Examples of these PDU types are probe request frames, beacon frames, and authentication/association request frames. PDU types that may be indicative of roaming may overlap at least partially with the PDU types that the system selectively captures as described above. The PDU types and subtypes that may correspond to roaming are designated for capturing in a PDU capture file by the interface configuration(s) by which the interfaces are instrumented for PDU capture. For instance, the configuration corresponding to the interface on which the PDU was received may designate 802.11 management frames as the PDU type to be captured and beacon frames, probe request frames, and authentication and association request frames as the subtypes to capture. The system may determine the type and optionally the subtype of the PDU based on a header(s) of the PDU that indicates the communication protocol according to which the PDU was sent. If the PDU type or type/subtype correspond to potential Wi-Fi roaming and thus should be captured, operations continue at block 611. Otherwise, the system allows the PDU to pass for processing, and operations continue at block 607.

At block 611, the system writes the PDU header(s) and data to a PDU capture file. The PDU capture file is a PCAP or PCAPNG file having a standard format used for capturing PDUs. The system writes the "raw" PDU to the PDU capture file such that any headers of the PDU as well as the payload/data are written to the file. If the PDU is the first PDU that the system has intercepted and determined should be captured, the system first creates the PDU capture file and writes the PDU to the file. As similarly described above, the system may create and write to multiple PDU capture files that correspond to respective wireless clients and/or PDU types. In this case, the system writes the PDU header(s) and data to the appropriate PDU capture file that corresponds to the wireless client and/or PDU type. Subsequent operations refer to "the PDU capture file" but should be understood to encompass each of the PDU capture files if the system has created and written to multiple files.

At block 613, the system reads the contents of the buffer that comprise throughput values for a period of n time increments and writes the throughput values to the PDU capture file. If multiple buffers were created for multiple respective sources of network statistics from which throughput values were determined (e.g., buffers for each of an interface(s) and a logical port(s) of the network device), the system writes the contents of each of the buffers to the PDU capture file and may further associate an identifier of the corresponding source of network statistics with each of the sets of throughput values. In implementations, the system may wait for a preconfigured number of time increments (e.g., 10 additional seconds/time increments) prior to reading the contents of the buffer and writing the contents to the PDU capture file. This allows for capturing of additional throughput values that indicate Wi-Fi throughput after the potential roaming event. Such values may be indicative of whether the client device has established a network connection with the network device discovered during roaming or whether the client device remains connected to the Wi-Fi network through its original connection (i.e., the initial frequency band and/or network device). The system may write the throughput values to the PDU capture file as metadata of the file, such as through storage of the values in a user-defined field(s) of the PDU capture file.

At block 615, the system determines if an upload criterion is satisfied. The upload criterion may be an established criterion that is based on a schedule and/or another triggering condition for uploading a PDU capture file to a virtual (e.g., cloud) server or a physical server, such as a size of the PDU capture file exceeding a threshold. As another example, writing of throughput values observed for a potential Wi-Fi roaming event may be a criterion for uploading the capture file for analysis and diagnosis of Wi-Fi performance issues. If the upload criterion is not satisfied, operations continue at block 607 when another PDU is received on an interface instrumented for PDU capture, which may be the same interface or a different interface. If the upload criterion is satisfied, operations continue at block 617.

At block 617, the system associates network context metadata with the PDU capture file. The system can associate the network context metadata with the PDU capture file as similarly described in reference to FIG. 4 at block 415. For instance, the network context metadata may be determined based on a neighbor table, topology table, and/or DCHP network table maintained by the network device and written to one or more user-defined metadata fields of the PDU capture file.

At block 619, the system uploads the PDU capture file to be retrieved for analysis. As similarly described in reference to FIG. 4 at block 417, uploading the PDU capture file may include uploading the file to a server with which the system has established a secure connection on which the management service executes. The system may add an identifier of the network device and/or an owner/user of the network device to the PDU capture file prior to upload of the file.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 405-411 of FIG. 4 and blocks 607-615 of FIG. 6 can be performed at least partially in parallel or concurrently as multiple PDUs are received on a same instrumented interface or on different instrumented interfaces. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
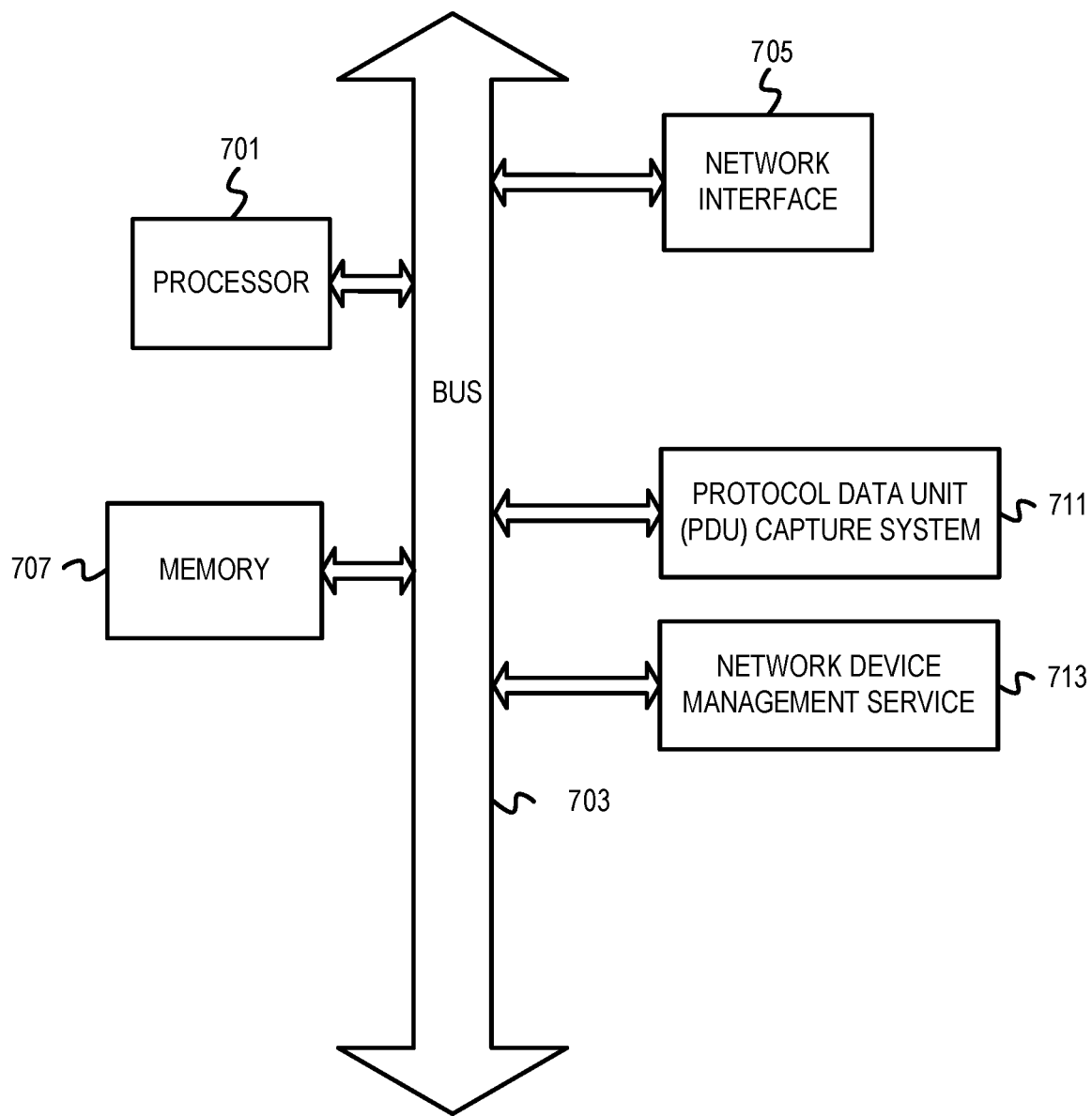
FIG. 7 depicts an example computer system with a PDU capture system and a network device management service.

FIG. 7 depicts an example computer system with a PDU capture system and a network device management service. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system also includes PDU capture system 711 and network device management service 713. The PDU capture system 711 selectively captures PDUs of one or more specified types and/or subtypes on one or more interfaces of a network device that have been instrumented for PDU capture and generates PDU capture files that are enhanced with metadata indicating information about the network environment in which the network device operates. The network device management service 713 communicates with and manages configuration of the PDU capture system 711 to facilitate network diagnostics operations that utilize PDU capture files generated by and received from the PDU capture system 711. The PDU capture system 711 and network device management service 713 do not necessarily execute on the same system. For instance, the PDU capture system 711 may execute on a network device, and the network device management service 713 may execute on a physical or virtual server. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for targeted PDU capture by a network device for enhanced wireless network diagnostics as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
receiving a first protocol data unit (PDU) on a first interface of a plurality of interfaces of a network device, wherein the first interface is one of the plurality of interfaces of the network device instrumented to capture PDUs, wherein the network device comprises a wireless access point;
determining a type of the first PDU, wherein the type of the first PDU corresponds to a communication protocol with which the first PDU is associated;
determining if the first PDU should be captured based on a type of the first PDU and a type of the first interface on which the first PDU was received;

based on determining that the first PDU should be captured, writing a copy of the first PDU in a PDU capture file;
associating information about a network environment in which the network device operates with the PDU capture file as metadata; and
based on determining that an upload criterion has been satisfied, uploading the PDU capture file having the metadata associated therewith to a server.

2. The method of claim 1 further comprising instrumenting the plurality of interfaces to capture PDUs based on, for each interface of the plurality of interfaces, declaring a raw socket and binding the raw socket to the interface.

3. The method of claim 2, wherein receiving the first PDU on the first interface comprises receiving the first PDU on the raw socket bound to the first interface.

4. The method of claim 1 further comprising determining the information about the network environment in which the network device operates based on at least one of a neighbor table, a topology table, and a Dynamic Host Configuration Protocol (DHCP) table that the network device maintains.

5. The method of claim 1, wherein the plurality of interfaces comprises at least one of an Ethernet interface, a wireless interface, a bridge interface, and a loopback interface of the network device.

6. The method of claim 1, wherein determining that an upload criterion has been satisfied comprises at least one of determining that the PDU capture file has reached a size threshold, determining that PDU capture has been ongoing for a time that exceeds a time threshold, or determining that the PDU capture file should be uploaded in accordance with a schedule.

7. The method of claim 1, wherein determining the type of the first PDU further comprises determining a subtype of the first PDU, and wherein determining if the first PDU should be captured based on the type of the first PDU further comprises determining if the first PDU should be captured based on the subtype of the first PDU.

8. The method of claim 1, wherein determining if the first PDU should be captured based on the type of the first PDU comprises determining if the first PDU is an 802.11 management frame, a DHCP message, a 4-way handshake message, or an Address Resolution Protocol (ARP) message.

9. The method of claim 1, wherein the PDU capture file is a Packet Capture (PCAP) file or a PCAP Next Generation (PCAPNG) file.

10. The method of claim 1 further comprising:
receiving a second PDU on the first interface of the network device;
determining that the second PDU should not be captured based on a type of the second PDU; and
allowing the second PDU to pass without writing a copy of the second PDU to the PDU capture file.

11. The method of claim 1, wherein the receiving, determining, and writing are triggered based on receipt of a request that indicates the network device, and wherein the receiving, determining, and writing are performed for a first length of time after receipt of the request.

12. The method of claim 11, wherein determining that the upload criterion has been satisfied comprises determining that the first length of time has elapsed.

13. One or more non-transitory computer-readable media comprising program code for a network device comprising a wireless access point to selectively capture protocol data units (PDUs), the program code comprising instructions executable by a processor to:
instrument a plurality of interfaces of the network device to capture PDUs;
for each PDU of a plurality of PDUs received on one of the plurality of interfaces,
determine a type of the PDU, wherein the type of the PDU corresponds to a communication protocol with which the PDU is associated;
determine whether to capture the PDU based on the type of the PDU and a type of the one of the plurality of interfaces on which the PDU was received;
based on a determination that the PDU should be captured, capture the PDU in a PDU capture file;
add information about other devices with network interfaces in a same network environment as the network device to the PDU capture file as metadata; and
upload the PDU capture file to a server, wherein the PDU capture file that is uploaded comprises copies of a subset of the plurality of PDUs and the metadata.

14. The non-transitory computer-readable media of claim 13, wherein the instructions to determine whether to capture the PDU comprise instructions to determine whether the type is one of a plurality of PDU types designated for capturing for the one of the plurality of interfaces.

15. The non-transitory computer-readable media of claim 14, wherein the instructions to determine the type of the PDU comprise instructions to determine at least one of the communication protocol with which the PDU is associated and a type of the PDU indicated in a header of the PDU, wherein the header is formatted according to the communication protocol with which the PDU is associated.

16. The non-transitory computer-readable media of claim 13, wherein the instructions to instrument the plurality of interfaces comprise instructions to, for each interface of the plurality of interfaces, declare a raw socket and bind the raw socket to the interface.

17. The non-transitory computer-readable media of claim 13 wherein the program code further comprises instructions to determine the information about other devices with network interfaces based on at least one of a neighbor table, a topology table, and a Dynamic Host Configuration Protocol (DHCP) table maintained by the network device.

18. The non-transitory computer-readable media of claim 13, wherein selectively capturing PDUs is triggered based on receipt of a request that indicates the network device, and wherein the instructions to upload the PDU capture file comprise instructions to upload the PDU capture file based on a determination that a first length of time since commencement of selectively capturing PDUs has elapsed.

19. A network device comprising:
a wireless access point;
a processor; and
a computer-readable medium having instructions stored thereon that are executable by the processor to cause the network device to,
for each interface of a plurality of interfaces of the network device that is instrumented to capture protocol data units (PDUs),
based on receipt of a PDU on the interface, determine a type of the PDU, wherein the type of the PDU corresponds to a communication protocol with which the PDU is associated;
determine if the type of the PDU is designated for capturing for the interface on which the PDU was received; and
based on a determination that the type of the PDU is designated for capturing, capture the PDU in a first file;

associate information determined about a network environment in which the network device is located with the first file as metadata; and upload the first file to a server based on satisfaction of an upload criterion.

20. The network device of claim 19, wherein the instructions executable by the processor to cause the network device to determine if the type of the PDU is designated for capturing comprise instructions executable by the processor to cause the network device to determine if the PDU is an 802.11 management frame, a Dynamic Host Configuration Protocol (DHCP) message, or an Address Resolution Protocol (ARP) message.

21. The network device of claim 19, wherein the instructions executable by the processor to cause the network device to capture the PDU in a first file comprise instructions executable by the processor to cause the network device to write a copy of the PDU to a Packet Capture (PCAP) file or a PCAP Next Generation (PCAPNG) file.

22. The network device of claim 19, wherein the plurality of interfaces comprise one or more of an Ethernet interface, a wireless interface, a bridge interface, and a loopback interface of the network device.

23. The network device of claim 19 further comprising instructions executable by the processor to cause the network device to instrument each interface of the plurality of interfaces, wherein the instructions executable by the processor to cause the network device to instrument each interface comprise instructions executable by the processor to cause the network device to declare a raw socket and bind the raw socket to the interface.

24. The network device of claim 19 further comprising instructions executable by the processor to cause the network device to determine that the upload criterion has been satisfied, wherein the instructions executable by the processor to cause the network device to determine that the upload criterion has been satisfied comprise instructions executable by the processor to cause the network device to determine that a first length of time since receipt of a request to capture PDUs in the first file has elapsed.

* * * * *

UNITED STATES PATENT AND TRADEMARK OFFICE
CERTIFICATE OF CORRECTION

PATENT NO. : 12,477,315 B2
APPLICATION NO. : 18/055461
DATED : November 18, 2025
INVENTOR(S) : Ta Chien Lin Page 1 of 1

It is certified that error appears in the above-identified patent and that said Letters Patent is hereby corrected as shown below:

In the Specification

Column 10, Line 7, the word "subsequent", should read --subsequently--

Column 21, Line 38, the word "correspond", should read --corresponds--

In the Claims

Column 27, Line 21 of Claim 22, the word "comprise", should read --comprises--

Signed and Sealed this
Twenty-third Day of December, 2025

John A. Squires
*Director of the United States Patent and Trademark Office*